US009250459B2

(12) United States Patent
Otsu et al.

(10) Patent No.: US 9,250,459 B2
(45) Date of Patent: *Feb. 2, 2016

(54) SPATIAL LIGHT MODULATOR, AND SPATIAL LIGHT MODULATING METHOD

(75) Inventors: Tomoko Otsu, Hamamatsu (JP); Naoya Matsumoto, Hamamatsu (JP); Yuu Takiguchi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 129 days.

This patent is subject to a terminal disclaimer.

(21) Appl. No.: 13/985,214
(22) PCT Filed: Feb. 10, 2012
(86) PCT No.: PCT/JP2012/053169
§ 371 (c)(1),
(2), (4) Date: Oct. 10, 2013
(87) PCT Pub. No.: WO2012/111570
PCT Pub. Date: Aug. 23, 2012

(65) Prior Publication Data
US 2014/0036206 A1 Feb. 6, 2014

(30) Foreign Application Priority Data
Feb. 15, 2011 (JP) ................. P2011-029913

(51) Int. Cl.
*G02F 1/133* (2006.01)
*G09G 3/36* (2006.01)
(52) U.S. Cl.
CPC .......... *G02F 1/13306* (2013.01); *G09G 3/3611* (2013.01); *G09G 2320/0285* (2013.01); *G09G 2320/041* (2013.01); *G09G 2360/145* (2013.01)
(58) Field of Classification Search
CPC .......... G02F 1/13306; G02F 1/133382; G02F 2203/12; G02F 2203/50; G02F 2203/60; G02F 2203/21; G09G 3/3611; G09G 2320/041; G09G 2320/0285; G09G 2360/145; G09G 3/3648

USPC .............................. 349/72; 345/101
See application file for complete search history.

(56) References Cited

U.S. PATENT DOCUMENTS

| | | | | |
|---|---|---|---|---|
| 5,151,814 A | * | 9/1992 | Grinberg et al. | 359/209.1 |
| 6,313,821 B1 | * | 11/2001 | Mizuno | 345/101 |
| 6,496,170 B1 | * | 12/2002 | Yoshida et al. | 345/87 |
| 2003/0201966 A1 | * | 10/2003 | Pan et al. | 345/101 |

(Continued)

FOREIGN PATENT DOCUMENTS

| | | |
|---|---|---|
| CN | 1703650 | 11/2005 |
| CN | 101051488 | 10/2007 |

(Continued)

OTHER PUBLICATIONS

English-language translation of International Preliminary Report on Patentability (IPRP) dated Aug. 29, 2013 that issued in WO Patent Application No. PCT/JP2012/053168.

*Primary Examiner* — Edward Glick
*Assistant Examiner* — David Chung
(74) *Attorney, Agent, or Firm* — Drinker Biddle & Reath LLP

(57) ABSTRACT

A spatial light modulation device includes a liquid crystal layer modulating a phase of incident light according to a level of an applied electric field, a temperature sensor generating a temperature signal corresponding to a temperature of the liquid crystal layer, a plurality of pixel electrodes provided for each of a plurality of pixels and applying a voltage to the liquid crystal layer, and a driving device providing a voltage to the plurality of pixel electrodes. The driving device has a nonvolatile storage element storing in advance a coefficient α included in a function expressing a correlation between a temperature change amount in the liquid crystal layer and a variation in phase modulation amount in the liquid crystal layer, and performs a calculation for correcting a level of voltage by use of a temperature indicated by the temperature signal and the coefficient α.

6 Claims, 17 Drawing Sheets

(56) References Cited

U.S. PATENT DOCUMENTS

| | | | |
|---|---|---|---|
| 2007/0182695 A1* | 8/2007 | Shimizu | G09G 3/3648 345/101 |
| 2010/0295836 A1* | 11/2010 | Matsumoto et al. | 345/211 |

FOREIGN PATENT DOCUMENTS

| | | |
|---|---|---|
| CN | 101889238 | 11/2010 |
| JP | H08-152602 A | 6/1996 |
| JP | 2000-010058 | 1/2000 |
| JP | 2001-343629 A | 12/2001 |
| JP | 2004-133159 A | 4/2004 |
| JP | 2006-184305 | 7/2006 |
| JP | 3859317 B2 | 12/2006 |
| JP | 2007-233061 A | 9/2007 |
| WO | WO-2009/072563 A1 | 6/2009 |

* cited by examiner (a)

| Current \ Target | 0 | 32 | 64 | 96 | 128 | 160 | 192 | 224 | 255 |
|---|---|---|---|---|---|---|---|---|---|
| 0 | 0 | 32 | 64 | 96 | 128 | 160 | 192 | 224 | 255 |
| 32 | 0 | 156 | 206 | 228 | 242 | 248 | 255 | 255 | 255 |
| 64 | 0 | 32 | 142 | 192 | 208 | 232 | 240 | 255 | 255 |
| 96 | 0 | 0 | 64 | 123 | 160 | 186 | 224 | 255 | 255 |
| 128 | 0 | 0 | 32 | 96 | 145 | 177 | 216 | 242 | 255 |
| 160 | 0 | 0 | 20 | 56 | 128 | 173 | 215 | 242 | 255 |
| 192 | 0 | 0 | 0 | 44 | 80 | 160 | 208 | 239 | 255 |
| 224 | 0 | 0 | 0 | 36 | 76 | 128 | 192 | 235 | 255 |
| 255 | 0 | 0 | 0 | 24 | 64 | 108 | 160 | 224 | 255 |
| | 0 | 0 | 0 | 0 | 16 | 60 | 126 | 192 | 255 |

SPATIAL LIGHT MODULATOR, AND SPATIAL LIGHT MODULATING METHOD

TECHNICAL FIELD

The present invention relates to a technique of correcting a variation in phase modulation amount according to a temperature change in a liquid crystal layer in a phase-modulation type spatial light modulation device and spatial light modulation method.

BACKGROUND ART

In Patent Document 1, there is described a technique of a temperature compensating device of a color liquid crystal display elements. An object of this technique is to make it possible to appropriately modify optimal output voltage data for temperature according to a variation or a temporal change for each of a plurality of color liquid crystal display elements. FIG. 14 is a block diagram showing a configuration of this device. As shown in FIG. 14, this device includes a temperature sensing circuit 211, a data table 212 in which digital optimal output voltage data for temperature are stored, and from which optimal output voltage data corresponding to temperature data from the temperature sensing circuit 211 are read out, voltage correction means 217 for correcting the optimal output voltage data read out from the data table 212, a D/A conversion circuit 213 which converts the optimal output voltage data from digital to analog, to transmit the data to a drive circuit of the liquid crystal display element, an operating unit 216 that provides correction data to the voltage correction means 217, and control means 214 for modifying the optimal output voltage data for temperature in the data table 212 based on correction data from the operating unit 216 and temperature data from the temperature sensing circuit 211.

Further, in Patent Document 2, there is described a technique of a liquid crystal panel driving device which drives a liquid crystal panel at a high speed by overdrive. FIG. 15 is a block diagram showing a configuration of this liquid crystal panel driving device. This liquid crystal panel driving device is a device which performs overdrive by use of a frame memory 231 and a lookup table 232, and includes plural types of lookup tables 232 corresponding to different temperature ranges. This device activates a selection circuit 233 so as to switch among the lookup tables 232 to use those based on temperature information of an LCD module 234 obtained from a temperature sensor 235.

Further, in Patent Document 3, there is described a technique of a semi-transmissive liquid crystal display device. FIG. 16 is a block diagram showing a configuration of this liquid crystal display device. This liquid crystal display device includes a correction circuit 241. The correction circuit 241 has a lookup table selection unit 242, a plurality of lookup tables for transmissive mode 243, a plurality of lookup tables for reflective mode 253, a frame memory 244, a mode determination unit 245, a switch 246, and a switch control unit 256. The lookup tables for transmissive mode 243 and the lookup tables for reflective mode 253 store correction values (correction gradations) in which temporal changes in signal are emphasized so as to correspond to combinations of current gradations and target gradations. In addition, FIG. 17 is a table showing a configuration example of this lookup table for reflective mode 253.

The switch control unit 256 stores a threshold value Y for an ambient temperature, and outputs a low-level switch control signal SC when a mode selection signal MD output from the mode determination unit 245 is at a low level or an ambient temperature T0 output via an A/D converter 247 from the temperature sensor 248 is lower than or equal to the threshold value Y, and outputs a high-level switch control signal SC in the other case. A correction gradation output from the lookup table for transmissive mode 243 or the lookup table for reflective mode 253 which is selected by the lookup table selection unit 242, an input video signal V1, and the switch control signal SC are input to the switch 246. The switch 246 outputs the correction gradation when the switch control signal SC is at a low level, and outputs the input video signal V1 when the switch control signal SC is at a high level, as a correction video signal V2.

CITATION LIST

Patent Literature

Patent Document 1: Japanese Patent Publication No. 3859317
Patent Document 2: Japanese Patent Application Laid-Open No. 2004-133159
Patent Document 3: Japanese Patent Application Laid-Open No. 2007-233061

SUMMARY OF INVENTION

Technical Problem

Conventionally, a technique for modulating a phase of light by a spatial light modulator (SLM) has been known. In general, a spatial light modulator includes a liquid crystal layer, and electrodes which are provided for each of a plurality of pixels along the liquid crystal layer. When a voltage is applied to the electrode, a liquid crystal molecule rotates according to a level of the voltage, to change the birefringence index of the liquid crystal. When light is made incident into this liquid crystal layer, a phase of the light changes within the liquid crystal layer, and light having a phase difference with respect to the incident light is emitted to the outside. Here, phase modulation characteristics of the spatial light modulator express the relationship between a level of the applied voltage and a phase difference (i.e., a phase modulation amount) of the emitted light before and after the voltage application. In the phase modulation characteristics, the relationship between a phase modulation amount and an applied voltage is nonlinear. In addition, in order to easily convert such a nonlinear relationship, in general, a lookup table (Look Up Table; LUT) showing a plurality of numerical values to which phase modulation amounts and applied voltages correspond is used.

However, there is a problem that the relationship between a phase modulation amount and an applied voltage varies when a temperature of the liquid crystal layer changes. That is, even in the case where a given constant voltage is applied, a phase modulation amount differs according to a temperature of the liquid crystal layer at that time. Such a phenomenon causes serious problems depending on an intended application for which the spatial light modulator is used. For example, in the case where an object to be processed is irradiated via the spatial light modulator with laser beam output from a laser beam source in laser processing, an error in a phase modulation amount exerts a great effect on processing accuracy. Further, in the case where the spatial light modulator is used for a microscope, an ophthalmoscope, or the like, there is a possibility that a useful observed image may not be obtained depending on its operating temperature.

In addition, an object of the temperature compensating device described in Patent Document 1 described above is to correct a color change according to a temperature change in the liquid crystal display element. This temperature compensating device retains an LUT showing the relationship between a temperature of the liquid crystal display element and an applied voltage value in advance, and selects an applied voltage value corresponding to a detected temperature from the LUT. Further, the devices described in Patent Documents 2 and 3 include a plurality of LUTs showing the relationship between a temperature and an applied voltage value, and select an optimal LUT according to a level of temperature change. In this way, the devices described in Patent Documents 1 to 3 all include the LUTs showing the relationship between a temperature and an applied voltage value. However, the relationship between a phase modulation amount and an applied voltage is nonlinear as described above, and if these relationships are shown by LUTs, it is necessary to retain a plurality of LUTs corresponding to a plurality of temperatures as Patent Documents 2 and 3, and a large storage capacity is required. Further, it takes a great deal of time and effort to create such LUTs, and the accuracy of an applied voltage value with respect to a desired phase modulation amount as well is suppressed.

The present invention has been made in view of the above problem, and an object thereof is to provide a spatial light modulation device and a spatial light modulation method in which it is possible to decrease a necessary storage capacity, which makes its production easy, and it is possible to improve the accuracy of an applied voltage value with respect to a desired phase modulation amount.

Solution to Problem

In order to solve the above-described problem, a spatial light modulation device according to the present invention is a spatial light modulation device which modulates a phase of incident light for each of the plurality of pixels one-dimensionally or two-dimensionally arrayed, and the device includes (1) a liquid crystal layer modulating a phase of the incident light according to a level of an applied electric field, (2) a temperature sensor generating a temperature signal which is a signal corresponding to a temperature of the liquid crystal layer, (3) a plurality of pixel electrodes which are provided for each of the plurality of pixels and apply a voltage for generating the applied electric field to the liquid crystal layer, and (4) a voltage generation unit providing the voltage to the plurality of pixel electrodes. The voltage generation unit has storage means storing in advance one or a plurality of coefficients included in a function expressing a correlation between a temperature change amount in the liquid crystal layer and a variation in phase modulation amount in the liquid crystal layer, and carries out a calculation for correcting a level of the voltage by use of a temperature indicated by the temperature signal provided from the temperature sensor, and the one or plurality of coefficients.

In this spatial light modulation device, the storage means of the voltage generation unit stores the one or plurality of coefficients included in the function expressing the correlation between a temperature change amount of the liquid crystal layer and a variation in phase modulation amount in the liquid crystal layer. As shown in the embodiment which will be described later, the inventors have found that such a function is determined in advance, and the coefficients thereof are stored, thereby it is possible to preferably correct a variation in phase modulation amount by the temperature change without using a large number of LUTs. That is, in this spatial light modulation device, the voltage generation unit carries out a calculation for correcting the level of the applied voltage by use of a temperature indicated by the temperature signal provided from the temperature sensor and the one or plurality of coefficients. Thereby, it is possible to provide a spatial light modulation device in which it is possible to decrease a necessary storage capacity, which makes its production easy. Moreover, different from the case where an LUT which is created for each temperature is used, it is possible to continuously obtain an applied voltage value corresponding to a desired phase modulation amount, so as to correspond to a temperature change in the liquid crystal layer, and accordingly, it is possible to improve the accuracy of an applied voltage value with respect to a desired phase modulation amount.

Further, the spatial light modulation device may have a configuration in which the function is a linear function, and the number of the coefficients is one. In this case, it is preferable for the spatial light modulation device that the range of the voltage be limited to a predetermined range in which it is possible to approximate the function as a linear function. Further, in this case, it is preferable for the spatial light modulation device that the voltage generation unit correct a control input value S for controlling a level of the voltage based on the following formula:

[Formula 1]

$$S = \frac{S0}{100 - (T - T0) \times \alpha} \times 100$$

(where, T is a temperature indicated by the temperature signal provided from the temperature sensor, T0 is a reference temperature, S0 is a control input value for obtaining a desired phase modulation amount at the reference temperature T0, and α is a coefficient).

Further, the spatial light modulation device may have a configuration in which the function is an n-th order function (n is an integer not less than 2), and the number of the coefficients is n. In this case, it is preferable for the spatial light modulation device that the voltage generation unit correct a control input value S for controlling a level of the voltage based on the following formula:

[Formula 2]

$$S = \frac{S0}{100 - (T - T0) \times \beta_1 - \ldots - (T - T0)^n \times \beta_n} \times 100$$

(where, T is a temperature indicated by the temperature signal provided from the temperature sensor, T0 is a reference temperature, S0 is a control input value for obtaining a desired phase modulation amount at the reference temperature T0, and $\beta_1 \ldots \beta_n$ are the n coefficients).

Further, a spatial light modulation method according to the present invention is a spatial light modulation method which uses a liquid crystal layer modulating a phase of incident light according to a level of an applied electric field, and a plurality of pixel electrodes which are provided for each of a plurality of pixels one-dimensionally or two-dimensionally arrayed, and apply a voltage for generating the applied electric field to the liquid crystal layer, and the method includes (1) a temperature acquisition step of acquiring a temperature signal which is a signal corresponding to a temperature of the liquid crystal layer from a temperature sensor, (2) a correction calculation step of reading out one or a plurality of coefficients from storage means storing in advance the one or plurality of coefficients included in a function expressing a correlation between a temperature change amount with respect to a reference temperature in the liquid crystal layer and a variation in phase modulation amount in the liquid crystal layer, and carrying out a calculation for correcting a level of the voltage by use of a temperature indicated by the temperature signal, and the one or plurality of coefficients, and (3) a voltage application step of providing the corrected voltage to the plurality of pixel electrodes.

In this spatial light modulation method, the storage means stores the one or plurality of coefficients included in the function expressing the correlation between a temperature change amount in the liquid crystal layer and a variation in phase modulation amount in the liquid crystal layer. As shown in the embodiment which will be described later, the inventors have found that such a function is determined in advance, and the coefficients thereof are stored, thereby it is possible to preferably correct a variation in phase modulation amount by the temperature change without using a large number of LUTs. That is, in this spatial light modulation method, in the correction calculation step, a calculation for correcting the level of the applied voltage is carried out by use of a temperature indicated by the temperature signal provided from the temperature sensor and the one or plurality of coefficients. Thereby, it is possible to provide a spatial light modulation method in which it is possible to decrease a necessary storage capacity, which makes production of the device used in the method easy. Moreover, different from the case where an LUT which is created for each temperature is used, it is possible to continuously obtain an applied voltage value corresponding to a desired phase modulation amount, so as to correspond to a temperature change in the liquid crystal layer, and accordingly, it is possible to improve the accuracy of an applied voltage value with respect to a desired phase modulation amount.

Further, the spatial light modulation method may have a configuration in which the function is a linear function, and the number of the coefficients is one. In this case, it is preferable for the spatial light modulation method that the range of the voltage be limited to a predetermined range in which it is possible to approximate the function as a linear function. Further, in this case, it is preferable for the spatial light modulation method that, in the correction calculation step, a control input value S for controlling a level of the voltage be corrected based on the following formula:

[Formula 3]

$$S = \frac{S0}{100 - (T - T0) \times \alpha} \times 100$$

(where, T is a temperature indicated by the temperature signal provided from the temperature sensor, T0 is a reference temperature, S0 is a control input value for obtaining a desired phase modulation amount at the reference temperature T0, and α is a coefficient).

Further, the spatial light modulation method may have a configuration in which the function is an n-th order function (n is an integer not less than 2), and the number of the coefficients is n. In this case, it is preferable for the spatial light modulation method that, in the correction calculation step, a control input value S for controlling a level of the voltage be corrected based on the following formula:

[Formula 4]

$$S = \frac{S0}{100 - (T - T0) \times \beta_1 - \ldots - (T - T0)^n \times \beta_n} \times 100$$

(where, T is a temperature indicated by the temperature signal provided from the temperature sensor, T0 is a reference temperature, S0 is a control input value for obtaining a desired phase modulation amount at the reference temperature T0, and $\beta_1 \ldots \beta_n$ are the n coefficients).

Advantageous Effects of Invention

In accordance with the present invention, it is possible to provide a spatial light modulation device and a spatial light modulation method in which it is possible to decrease a necessary storage capacity, which makes its production easy, and it is possible to improve the accuracy of an applied voltage value with respect to a desired phase modulation amount.

BRIEF DESCRIPTION OF DRAWINGS

FIG. 17 is a table showing a configuration example of a lookup table for reflective mode of the liquid crystal display device described in Patent Document 3.

DESCRIPTION OF EMBODIMENTS

Hereinafter, embodiments of a spatial light modulation device and a spatial light modulation method according to the present invention will be described in detail with reference to the accompanying drawings. In addition, the same components are denoted by the same reference symbols in the description of the drawings, and overlapping descriptions thereof will be omitted.

Figure 1:
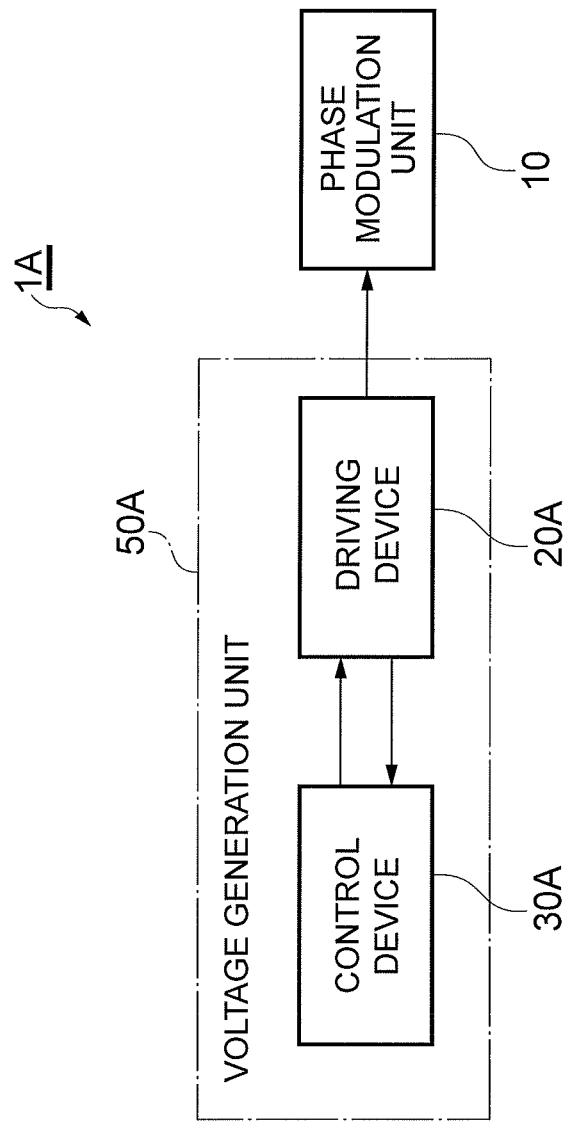
FIG. 1 is a block diagram schematically showing a configuration of a spatial light modulation device according to an embodiment.

FIG. 1 is a block diagram schematically showing a configuration of a spatial light modulation device 1A according to an embodiment of the present invention. As shown in FIG. 1, the spatial light modulation device 1A of the present embodiment includes a phase modulation unit 10. The phase modulation unit 10 is a reflective-type liquid crystal display panel (a so-called LCOS-SLM) having a configuration in which a liquid crystal is formed on a silicon substrate. This phase modulation unit 10 modulates a phase of incident light. Further, the spatial light modulation device 1A includes a voltage generation unit 50A. The voltage generation unit 50A includes a driving device 20A and a control device 30A. The phase modulation unit 10, the driving device 20A, and the control device 30A are respectively disposed in the housings independent of each other.

Figure 2:
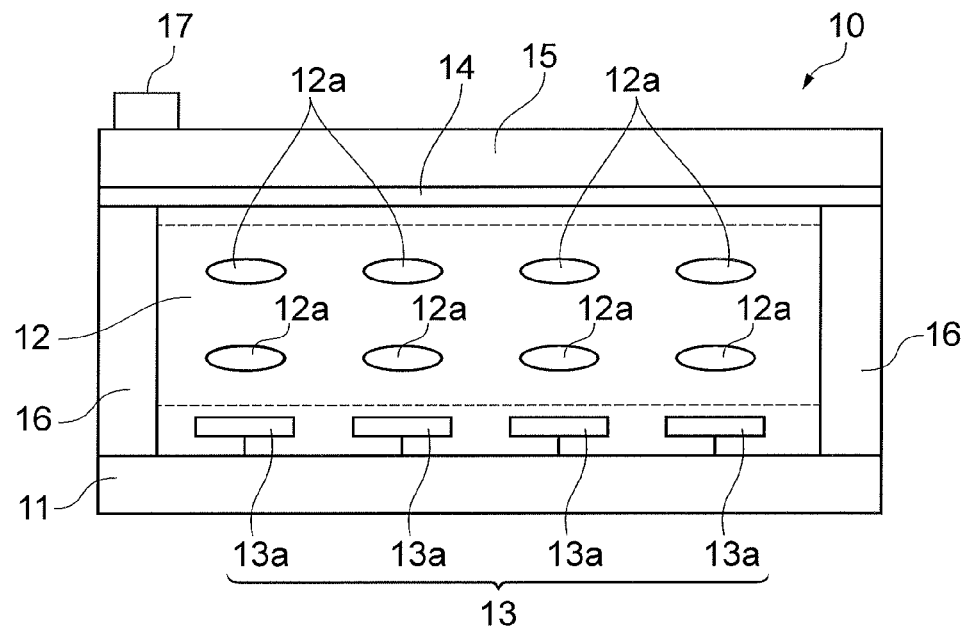
FIG. 2 includes (a) a diagram showing a part of the configuration of a phase modulation unit, and (b) a diagram showing a situation in which liquid crystal molecules on respective pixel electrodes rotate.
Figure 2:
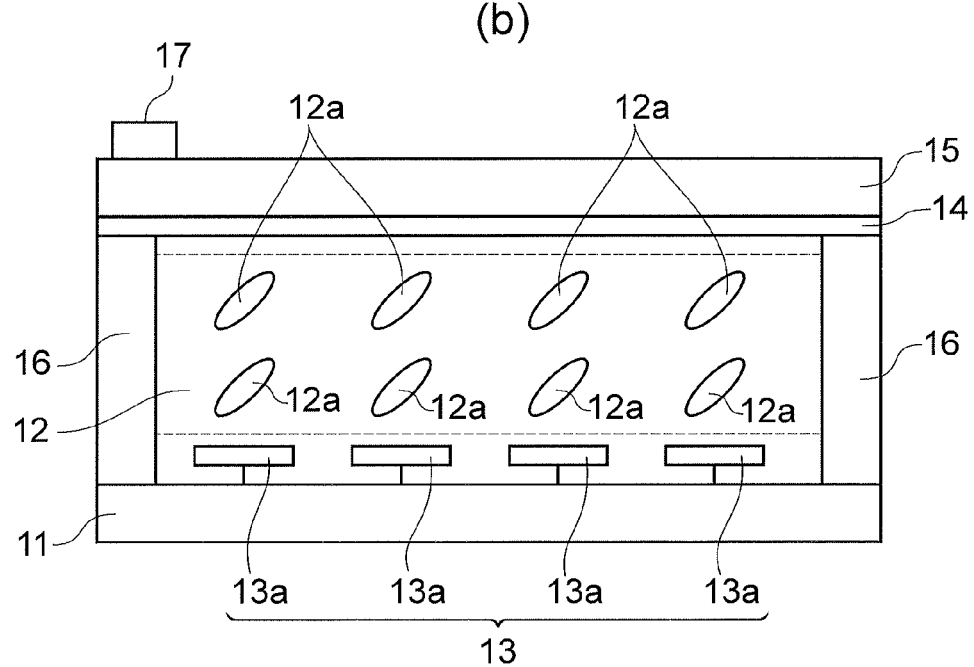

(a) in FIG. 2 is a side sectional view showing a part of the configuration of the phase modulation unit 10. The phase modulation unit 10 has a silicon substrate 11 and a liquid crystal layer 12 provided on the silicon substrate 11. Further, the phase modulation unit 10 further has a first electrode 13 disposed between the silicon substrate 11 and the liquid crystal layer 12, and a second electrode 14 provided at a position so as to sandwich the liquid crystal layer 12 with the first electrode 13. The first electrode 13 has a plurality of pixel electrodes 13a for applying voltage to the liquid crystal layer 12. The plurality of pixel electrodes 13a are two-dimensionally arrayed in a plurality of rows and a plurality of columns, and a plurality of pixels of the phase modulation unit 10 are defined by these pixel electrodes 13a. The second electrode 14 is made of a metal film evaporated on one surface of a glass substrate 15. The glass substrate 15 is supported on the silicon substrate 11 via a spacer 16 such that the above-described one surface and the silicon substrate 11 face each other. The liquid crystal layer 12 is formed by filling the space between the silicon substrate 11 and the glass substrate 15 with liquid crystals.

In the phase modulation unit 10 having such a configuration, an analog signal voltage output from the driving device 20A is applied between the respective pixel electrodes 13a and the second electrode 14. Thereby, an electric field is generated in the liquid crystal layer 12. Then, as shown in (b) in FIG. 2, liquid crystal molecules 12a on the respective pixel electrodes 13a rotate according to the level of the applied electric field. Because the liquid crystal molecules 12a have birefringence characteristics, when light passes through the glass substrate 15, to be made incident, a phase difference corresponding to the rotation of the liquid crystal molecules 12a is provided only for light components parallel to the orientation direction of the liquid crystal molecules 12a in this light. In this way, a phase of light is modulated at each pixel electrode 13a.

Further, as will be described later, the relationship between the birefringence index which the liquid crystal molecules 12a have and the applied voltage to the pixel electrodes 13a varies according to a temperature change in the liquid crystal layer 12. The phase modulation unit 10 of the present embodiment further has a temperature sensor 17 in order to correct such a variation caused by a temperature change. The temperature sensor 17 is provided in order to detect a temperature of the phase modulation unit 10, in particular, a temperature of the liquid crystal layer 12, and generates a temperature signal Stemp which is a signal corresponding to the temperature of the liquid crystal layer 12. The temperature sensor 17 is disposed, for example, on the silicon substrate 11 or on the glass substrate 15.

Figure 3:
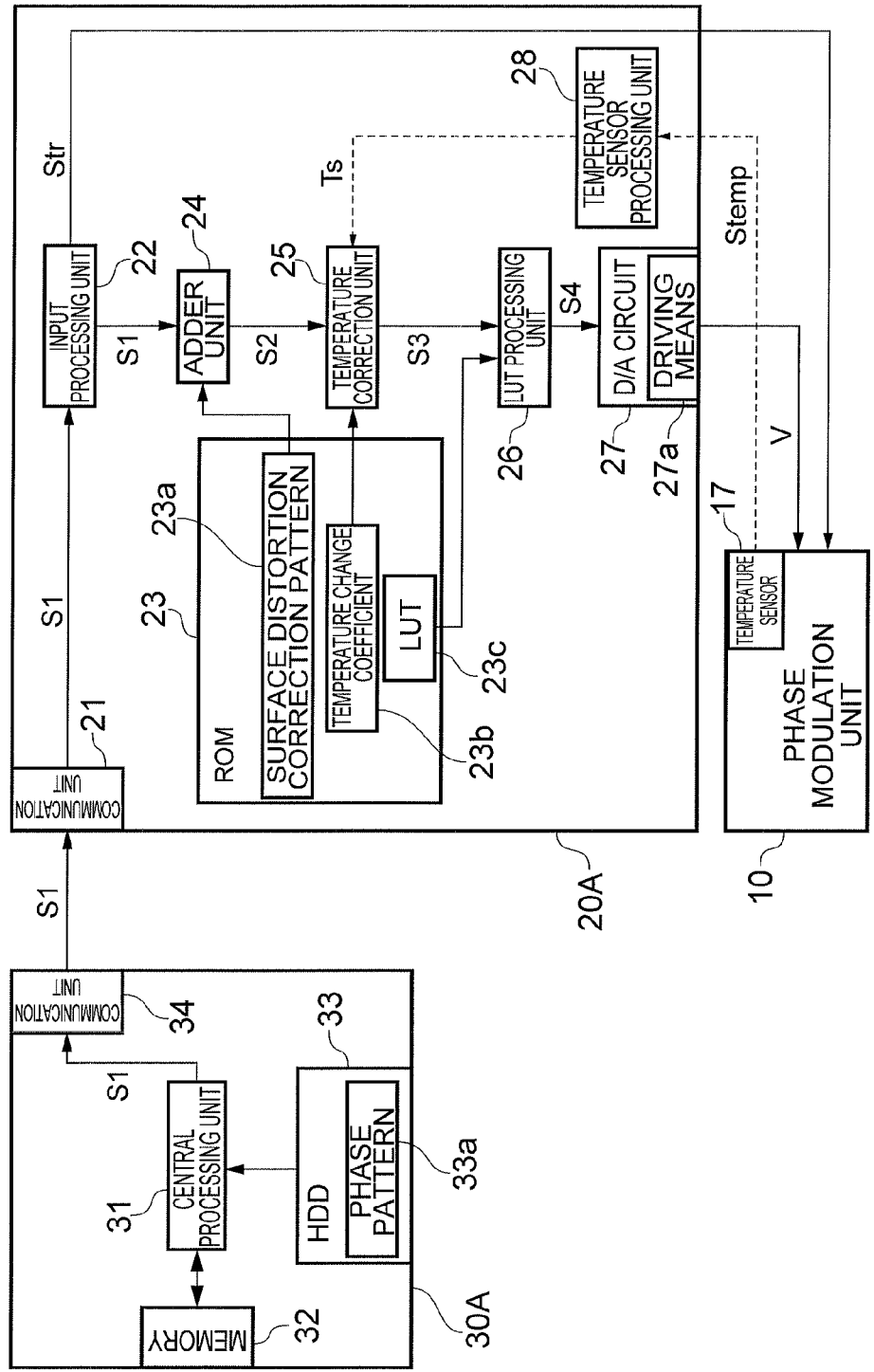
FIG. 3 is a block diagram showing the configurations of a driving device and a control device of a voltage generation unit.

The voltage generation unit 50A provides an analog voltage to the plurality of pixel electrodes 13a. FIG. 3 is a block diagram showing the configurations of the driving device 20A and the control device 30A of the voltage generation unit 50A. As shown in FIG. 3, the control device 30A is preferably realized by, for example, an electronic computer or the like having a central processing unit (CPU) 31, a memory 32, and a hard disk 33. The hard disk 33 stores a desired phase pattern 33a. The phase pattern 33a is data for performing phase modulation at a desired phase modulation amount for each pixel of the phase modulation unit 10. The central processing unit 31 and the memory 32 transform the phase pattern 33a into a control input value (gradation value) S1 for controlling a voltage value to be applied to the liquid crystal layer 12 of the phase modulation unit 10. The control device 30A further has a communication unit 34 which carries out transmission/reception of a signal with the driving device 20A, and the control input value S1 is transmitted to a communication unit 21 of the driving device 20A via the communication unit 34. In addition, as communication means between the communication unit 34 and the communication unit 21, various means such as serial communication or parallel communication may be used. Further, the communication means may be any of wired and wireless communication means.

As shown in FIG. 3, the driving device 20A has the communication unit 21, an input processing unit 22, a nonvolatile storage element (Read Only Memory: ROM) 23, an adder unit 24, a temperature correction unit 25, an LUT processing unit 26, a digital-analog converter unit 27, and a temperature sensor processing unit 28.

The communication unit 21 carries out transmission/reception of a signal such as the control input value S1 with the communication unit 34 of the control device 30A. The input processing unit 22 generates a trigger signal Str for generating a vertical synchronizing signal and a horizontal synchronizing signal based on the signal received from the communication unit 21. The nonvolatile storage element 23 is storage means for storing surface distortion correction pattern data 23a, temperature change coefficient data 23b, and an LUT 23c. The surface distortion correction pattern data 23a is data for correcting surface distortion generated on the surface of the first electrode 13 at the time of making up circuit elements around the pixel electrodes 13a on the silicon substrate 11 by a phase difference provided by the liquid crystal layer 12. The temperature change coefficient data 23b is data on coefficients for correcting a variation in the relationship between an applied voltage to the pixel electrodes 13a and a phase modulation amount by a temperature change in the liquid crystal layer 12. The LUT 23c is data for correcting the nonlinearity of the liquid crystal layer 12, i.e., the nonlinearity between a level of voltage to be applied to each pixel electrode 13a and a phase modulation amount. In addition, the LUT 23c is data when a temperature of the liquid crystal layer 12 is a reference temperature.

The adder unit 24 reads out the surface distortion correction pattern data 23a from the nonvolatile storage element 23, and adds the surface distortion correction pattern data 23a to the control input value S1 provided from the control device 30A, thereby generating a surface-distortion-corrected control input value S2. The adder unit 24 outputs the generated control input value S2 to the temperature correction unit 25. The temperature correction unit 25 corrects a variation in modulation characteristics by a temperature change in the liquid crystal layer 12 for the control input value S2. The temperature correction unit 25 reads out the temperature change coefficient data 23b from the nonvolatile storage element 23. Then, the temperature correction unit 25 performs predetermined arithmetic processing on the control input value S2 based on the temperature change coefficient data 23b and a temperature value Ts obtained from the temperature sensor processing unit 28, thereby generating a control input value S3. The temperature correction unit 25 outputs the generated control input value S3 to the LUT processing unit 26.

The LUT processing unit 26 reads out the LUT 23c from the nonvolatile storage element 23. Then, the LUT processing unit 26 performs predetermined arithmetic processing on the value output from the temperature correction unit 25 by use of this LUT 23c, thereby generating a control input value S4. This control input value S4 is a value, in which the control input value S3 is converted into a preferable value to be input to the digital-analog converter unit 27. The LUT processing unit 26 outputs the generated control input value S4 to the digital-analog converter unit 27. The digital-analog converter unit 27 generates an analog voltage V for each pixel which is applied to the respective pixels of the phase modulation unit 10 based on the control input value S4. These analog voltages V are output to the phase modulation unit 10 through a driving means 27a, to be applied to the respective pixel electrodes 13a (refer to FIG. 2). In the phase modulation unit 10, the inclination of the liquid crystal molecules 12a (refer to FIG. 2) changes according to a level of the applied voltage V, to cause a change in refractive index. As a result, the phase distribution corresponding to the desired phase pattern 33a is spatially expressed, thereby modulating the phase of the incident light.

The temperature sensor processing unit 28 receives a temperature signal Stemp of a current temperature of the liquid crystal layer 12 from the temperature sensor 17 of the phase modulation unit 10. The temperature sensor processing unit 28 provides a temperature value Ts of the liquid crystal layer 12 read from this temperature signal Stemp, to the temperature correction unit 25.

In addition, all or some of the surface distortion correction pattern data 23a, the temperature change coefficient data 23b, and the LUT 23c which are stored in the nonvolatile storage element 23 of the driving device 20A may be stored on the hard disk 33 of the control device 30A. In that case, it is preferable that all or some of the functions of the adder unit 24, the temperature correction unit 25, and the LUT processing unit 26 be realized by the central processing unit 31 and the memory 32.

Further, in the phase modulation unit 10, a phase modulation amount $\phi$ has nonlinearity with respect to an applied voltage value V. Then, in the present embodiment, the control input value S1 whose relationship with the phase modulation amount $\phi$ is able to be handled as linear is defined for convenience, and the correspondence relationship between this control input value S1 and the voltage value V to be applied to the respective pixel electrodes 13a is to be expressed in the LUT 23c. In addition, the control input value S1 is an integer from 0 to 255 in one example.

The LUT 23c is created as follows for example. First, a discrete numerical value group $\Phi$ of phase modulation amounts $\phi$ having linearity with respect to the control input value S1 is specified. For example, in the case where the control input value S1 is set as an integer from 0 to 255, and the phase modulation amount $\phi$ is set as a numerical value from 0 to $2\pi$ (rad), the relationship between the respective numerical values of the phase modulation amount $\phi$ and the control input value S1 is defined such that the respective numerical values included in the numerical value group $\Phi$ of the phase modulation amounts $\phi$ satisfy the following formula:

$$\phi = S \times 2\pi / 255.$$

In this formula, the respective numerical values of the phase modulation amount $\phi$ and the corresponding control input value S1 are in a relationship linear to each other.

Next, a voltage value V to be applied to the pixel electrodes 13a in order to realize each phase modulation amount $\phi$ included in the numerical value group $\Phi$ is calculated based on the known phase modulation characteristics of the phase modulation unit 10. Then, a table of the phase modulation amounts $\phi$ included in the numerical value group $\Phi$ and the corresponding voltage values V is created. Because the phase modulation amounts $\phi$ included in the numerical value group $\Phi$ and the respective integers as the control input value S1 are in a relationship linear to each other, this table is further converted into a correspondence table of the control input value S1 and the voltage value V. This converted correspondence table is to be the LUT 23c.

In addition, as a matter of convenience in the present embodiment, an input value S to the LUT 23c is defined, and the LUT 23c expresses the relationship between the control input value S1 and the voltage value V, meanwhile, an input to the LUT 23c may be a phase modulation amount $\phi$, and the LUT 23c may express the relationship between the phase modulation amount $\phi$ and the voltage value V.

Figure 4:
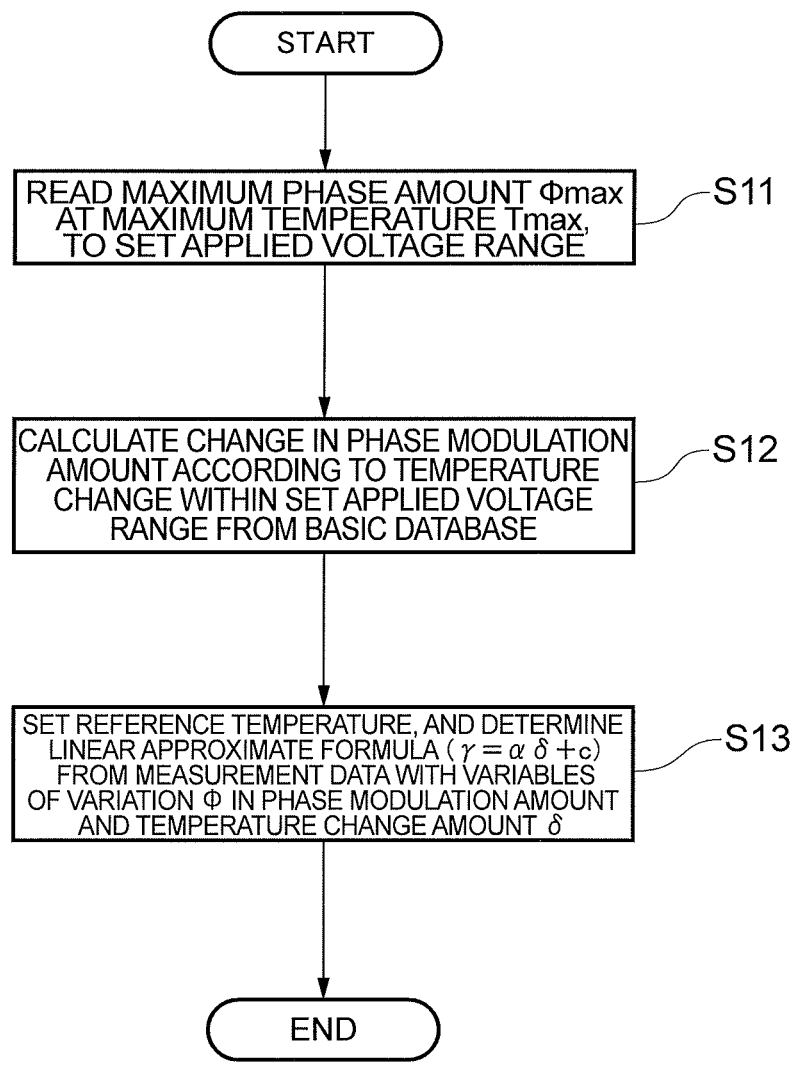
FIG. 4 is a flowchart showing a calculation method of temperature change coefficient data.
Figure 5:
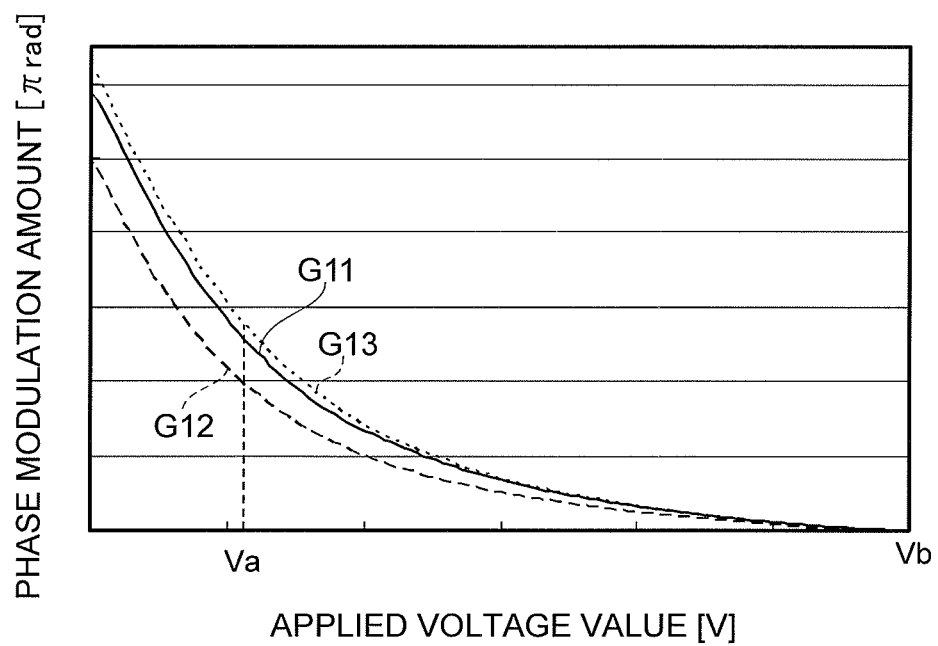
FIG. 5 is a graph showing an example of the relationship between an applied voltage to the pixel electrode and a phase modulation amount.

Next, a calculation method of the temperature change coefficient data 23b will be described. FIG. 4 is a flowchart showing the calculation method. Further, FIG. 5 is a graph showing an example of the relationship between an applied voltage V to the pixel electrode 13a and a phase modulation amount $\phi$. FIG. 5 shows a graph G11 when a temperature of the liquid crystal layer 12 is the reference temperature T0, a graph G12 at a maximum temperature Tmax which is estimated in the usage environment of the spatial light modulation device 1A, and a graph G13 at a minimum temperature Tmin which is estimated in the usage environment of the spatial light modulation device 1A. In addition, it is preferable that a calculation of the temperature change coefficient data 23b be carried out, for example, during the inspection of the spatial light modulation device 1A, etc.

First, a range of applied voltages to the pixel electrodes 13a is set based on the maximum temperature Tmax estimated in the liquid crystal layer 12, and the maximum phase modulation amount $\phi$max required for the phase modulation unit 10 at the maximum temperature Tmax (Step S11). In addition, in the following description, to facilitate understanding, the maximum phase modulation amount $\phi$max is set to $2\pi$ (rad). Further, it is given that a maximum value in the applied voltage range A set in this step S11 is Vb, and a minimum value (that is a voltage value corresponding to the maximum phase modulation amount $\phi$max) is Va (refer to FIG. 5).

Figure 6:
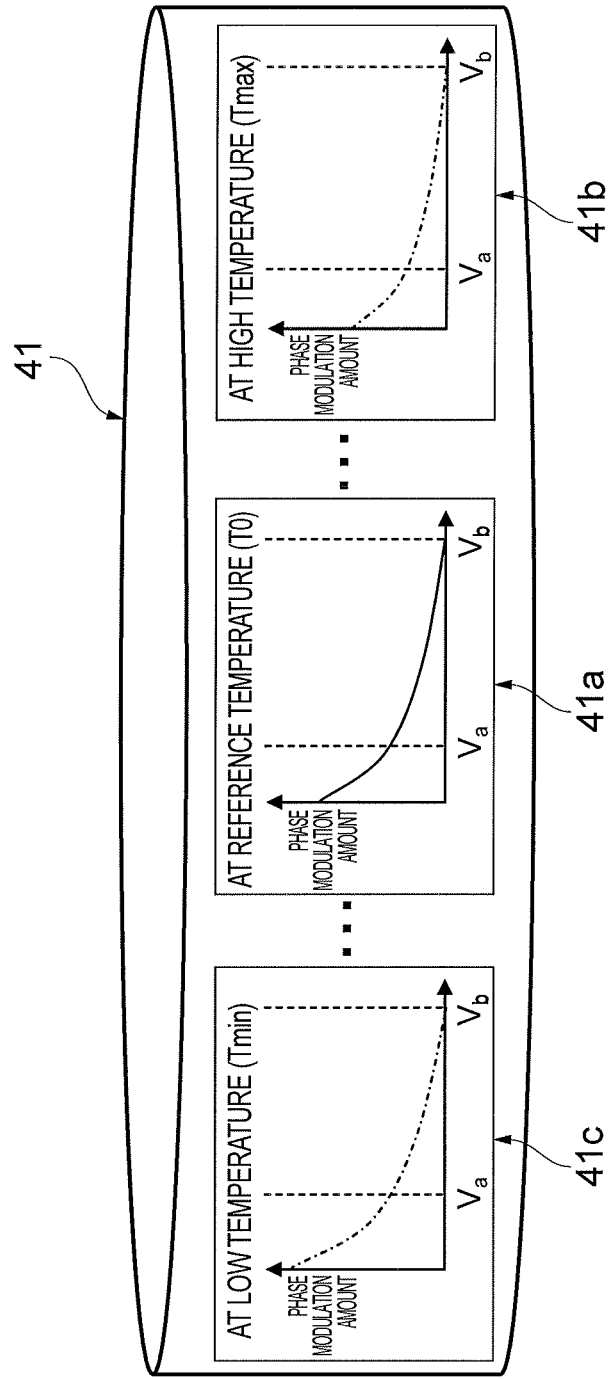
FIG. 6 is a diagram conceptually showing a configuration of a basic database.

Next, based on the database (hereinafter called the basic database) prepared in advance, a variation in phase modulation characteristics according to a temperature change in the liquid crystal layer 12 in the applied voltage range A (Va to Vb) set in the above-described Step S11 is calculated (Step S12). Here, FIG. 6 is a diagram conceptually showing a configuration of the basic database. A basic database 41 includes multiple data prepared at respective temperatures of a discrete temperature value group included in this temperature range (data showing the relationship between the applied voltage V and the phase modulation amount φ) in the temperature range Tmin to Tmax of the liquid crystal layer 12. In addition, as shown in FIG. 6, data at reference 41a showing the relationship between the applied voltage V and the phase modulation amount φ at the reference temperature T0, data at a high temperature 41b showing the relationship between the applied voltage V and the phase modulation amount φ when a temperature of the liquid crystal layer 12 is the maximum temperature Tmax, and data at a low temperature 41c showing the relationship between the applied voltage V and the phase modulation amount φ when a temperature of the liquid crystal layer 12 is the minimum temperature Tmin are included in these multiple data. In the multiple data including these data 41a to 41c which are included in the basic database 41, the relationships between the applied voltages V and the phase modulation amounts φ are all nonlinear. In this step S12, variations in phase modulation characteristics according to a temperature change in the liquid crystal layer 12 are calculated over the entire range of the applied voltage range A (Va to Vb) by use of such a basic database 41.

Figure 7:
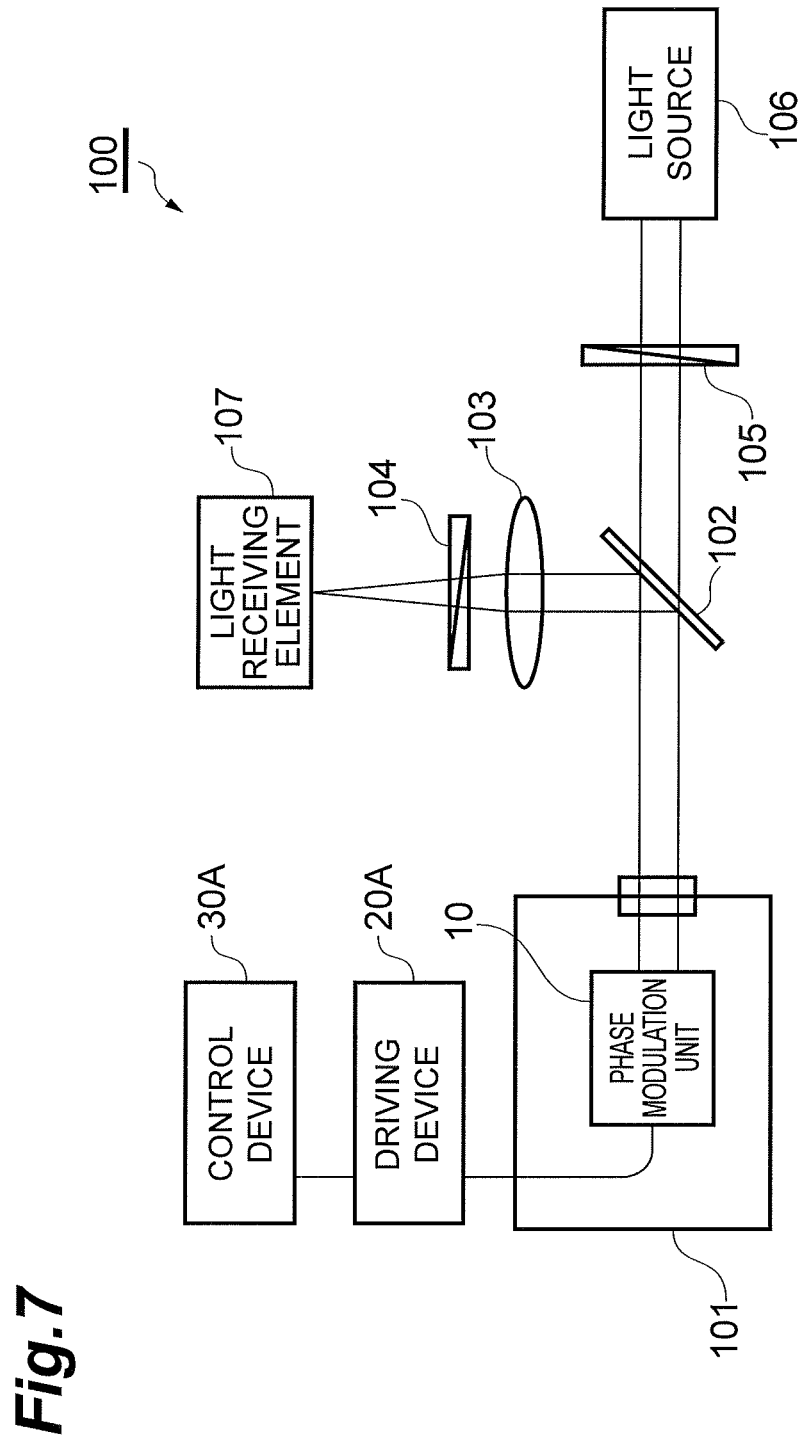
FIG. 7 is a diagram showing a polarization interferometer as an example of an optical system which is used at the time of creating the basic database.

Here, FIG. 7 is a diagram showing a polarization interferometer 100 as an example of an optical system which is used at the time of creating the basic database. This polarization interferometer 100 includes a temperature control device 101, a half mirror 102, a lens 103, an analyzer 104, a polarizer 105, a light source 106, and a light receiving element 107. The temperature control device 101 is a device for controlling a temperature of the liquid crystal layer 12 in the phase modulation unit 10 to be an arbitrary temperature. The light source 106 generates light with a predetermined wavelength. This light with a predetermined wavelength is made incident into the phase modulation unit 10 via the polarizer 105 and the half mirror 102. The light receiving element 107 detects a light intensity of emitted light from the phase modulation unit 10. The emitted light from the phase modulation unit 10 is reflected by the half mirror 102, to thereafter reach the light receiving element 107 via the lens 103 and the analyzer 104. The analyzer 104 is in a relationship of crossed Nicol or open Nicol with respect to the polarizer 105.

At the time of creating the basic database, first, the phase modulation unit 10 is housed in the temperature control device 101, to control the liquid crystal layer 12 of the phase modulation unit 10 to be an arbitrary temperature. Then, after the temperature of the liquid crystal layer 12 becomes stabilized at a predetermined temperature, the voltages are applied to the pixel electrodes 13a while changing an applied voltage within the entire voltage range which is able to be applied to the liquid crystal layer 12, and a phase difference between the incident light and the emitted light generated by the electric field is measured. In detail, linearly-polarized light parallel to the orientation direction of the liquid crystal layer 12 is generated by the polarizer 105, and this light is made incident into the phase modulation unit 10. At this time, phase modulation (phase delay) occurs in the emitted light from the phase modulation unit 10 according to a level of the applied voltage to the pixel electrodes 13a. Then, when this emitted light passes through the analyzer 104, because this analyzer 104 is in a relationship of crossed Nicol (or open Nicol) with respect to the polarizer 105, the light intensity thereof changes according to a phase modulation amount of the emitted light. Accordingly, based on the light intensity detected in the light receiving element 107 and an applied voltage value at that time, it is possible to preferably obtain the relationship between the applied voltage and the phase modulation amount, i.e., the basic database when a temperature of the liquid crystal layer 12 is a predetermined temperature.

Figure 8:
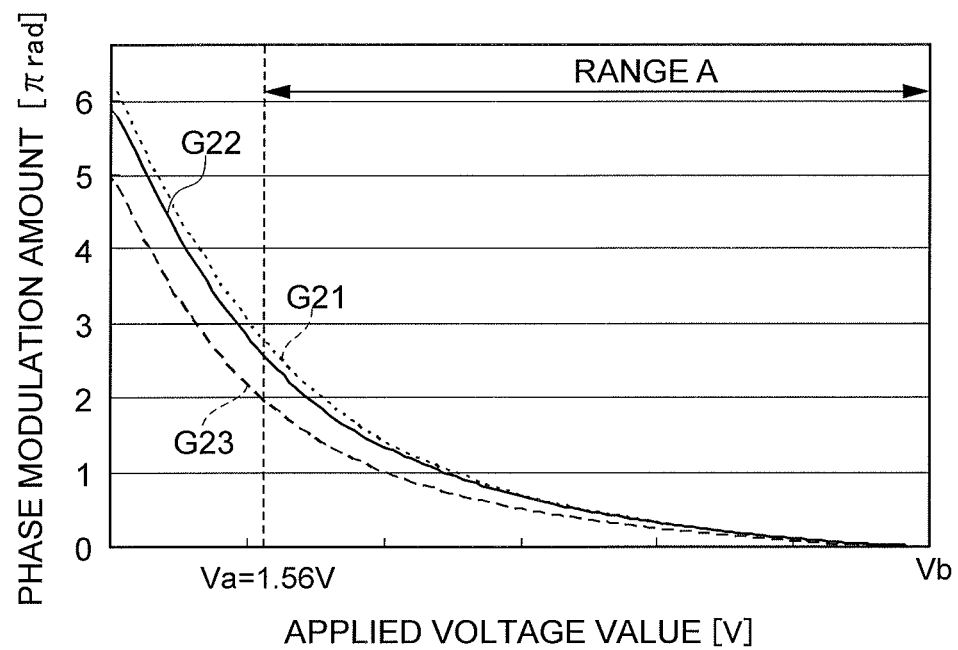
FIG. 8 is a graph showing a specific example of the relationship between an applied voltage and a phase modulation amount.

In addition, FIG. 8 is a graph showing a specific example of the relationship between the applied voltage and the phase modulation amount which can be obtained in this way, a graph G21 shows the case where a temperature of the liquid crystal layer 12 is 20 degrees (the minimum temperature Tmin), a graph G22 shows the case where a temperature of the liquid crystal layer 12 is 27 degrees (the reference temperature T0), and a graph G23 shows the case where a temperature of the liquid crystal layer 12 is 42 degrees (the maximum temperature Tmax), respectively. Further, in these graphs, the minimum voltage Va (i.e., an applied voltage by which a phase modulation amount becomes $2\pi$ (rad)) in the applied voltage range A is 1.56 (V). With reference to FIG. 8, it is understood that $2.56\pi$ (rad) is obtained as a phase modulation amount φ for the maximum voltage Vb in the case where a temperature of the liquid crystal layer 12 is the reference temperature T0, and $2.79\pi$ (rad) is obtained as a phase modulation amount φ for the maximum voltage Vb in the case where a temperature is the minimum temperature Tmin.

As described above, in this Step S12, a phase modulation amount φ is measured at each temperature of the liquid crystal layer 12 over the entire voltage range which can be applied to the liquid crystal layer 12, and the results thereof are summarized in a table for each temperature.

In addition, because the set voltage range A (Va to Vb) differs depending on a wavelength of incident light in the phase modulation unit 10, the phase modulation amount φ as well differs depending on a wavelength of incident light. However, in the present embodiment, the above-described Step S12 is carried out only once by use of incident light with a reference wavelength, and the following conversion formula is applied to the basic database obtained as a result of Step S12, thereby it is possible to obtain a basic database for another wavelength. That is, given that a reference wavelength is $\lambda_{standard}$, and a phase modulation amount at a display gradation value tv is $\phi_{standard}$(tv), a phase modulation amount φ (tv) at a given wavelength is determined by the following formula (1).

[Formula 5]

$$\phi(tv) = \phi_{standard}(tv) \times \frac{\lambda_{standard}}{\lambda} \quad (1)$$

In addition, the wavelength dispersive characteristics of the liquid crystal layer 12 may be further taken into consideration in the above formula (1).

Then, the table of the phase modulation amount φ for each temperature determined by the above-described method is converted into a table of a variation γ in phase modulation amount. That is, given that a phase modulation amount obtained when the phase modulation unit 10 is at a temperature T is $\phi_T$, and a phase modulation amount obtained when the phase modulation unit 10 is at the reference temperature T0 is $\phi_0$, it is possible to calculate a variation $\gamma$ in phase modulation amount by the following formula (2).

[Formula 6]

$$\gamma = \frac{\phi_T}{\phi_0} \times 100 \quad (2)$$

Figure 9:
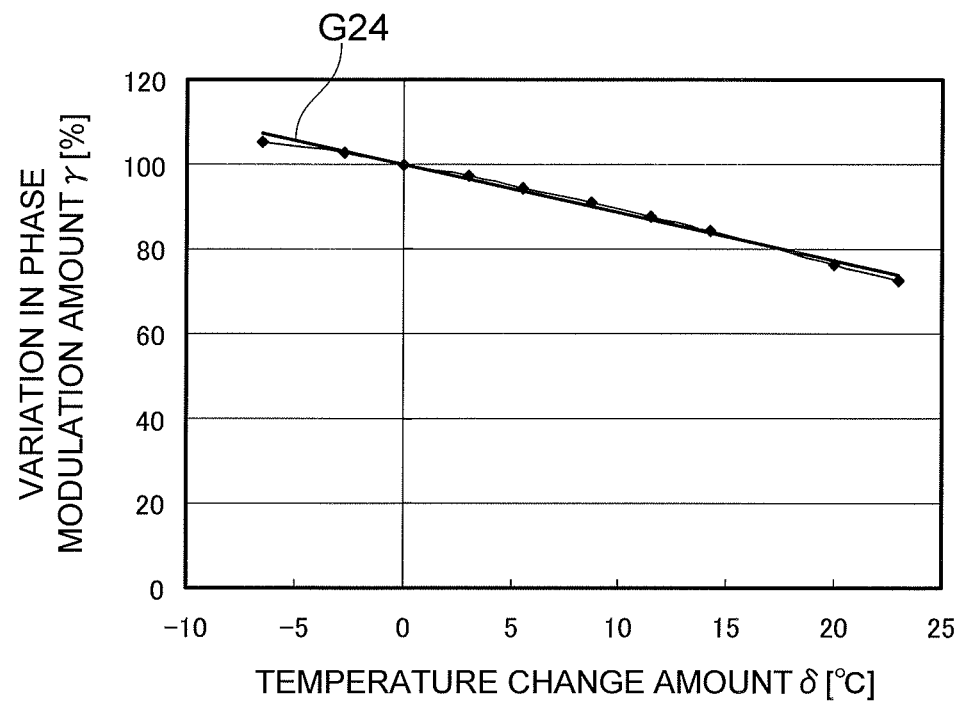
FIG. 9 is a graph showing an example of the relationship between a temperature change amount δ (° C.) of the liquid crystal layer, and a variation in phase modulation amount γ (%).

As shown in FIG. 4, after the variation $\gamma$ in phase modulation amount according to a temperature change in the liquid crystal layer 12 is calculated in the above-described Step S12, a temperature change coefficient $\alpha$ included in the temperature change coefficient data 23b is calculated by use of this calculated variation $\gamma$ (Step S13). Here, FIG. 9 is a graph showing an example of the relationship between a temperature change amount $\delta$ (° C.) of the liquid crystal layer 12 and a variation $\gamma$ in phase modulation amount based on the data obtained in Step S12. In addition, a temperature change amount $\delta$ is a difference (T−T0) between the reference temperature T0 and the temperature T.

With reference to FIG. 9, it is understood that a temperature change amount $\delta$ of the liquid crystal layer 12 and a variation $\gamma$ in phase modulation amount are in a substantially proportional relationship, and it is possible to approximate it with a linear function G24. Such approximation is possible in the case where an applied voltage range is limited within the applied voltage range A shown in FIG. 8, i.e., a predetermined range which can be approximated as a linear function. In this Step S13, a constant $\alpha$ of the following approximate formula (3) in this proportional relationship is determined.

[Formula 7]

$$\gamma = \alpha\delta + c \quad (3)$$

This constant $\alpha$ is the temperature change coefficient $\alpha$ as the temperature change coefficient data 23b. In other words, the temperature change coefficient $\alpha$ expresses a change in phase modulation characteristics according to a temperature change in the liquid crystal layer 12 as a given coefficient.

Figure 10:
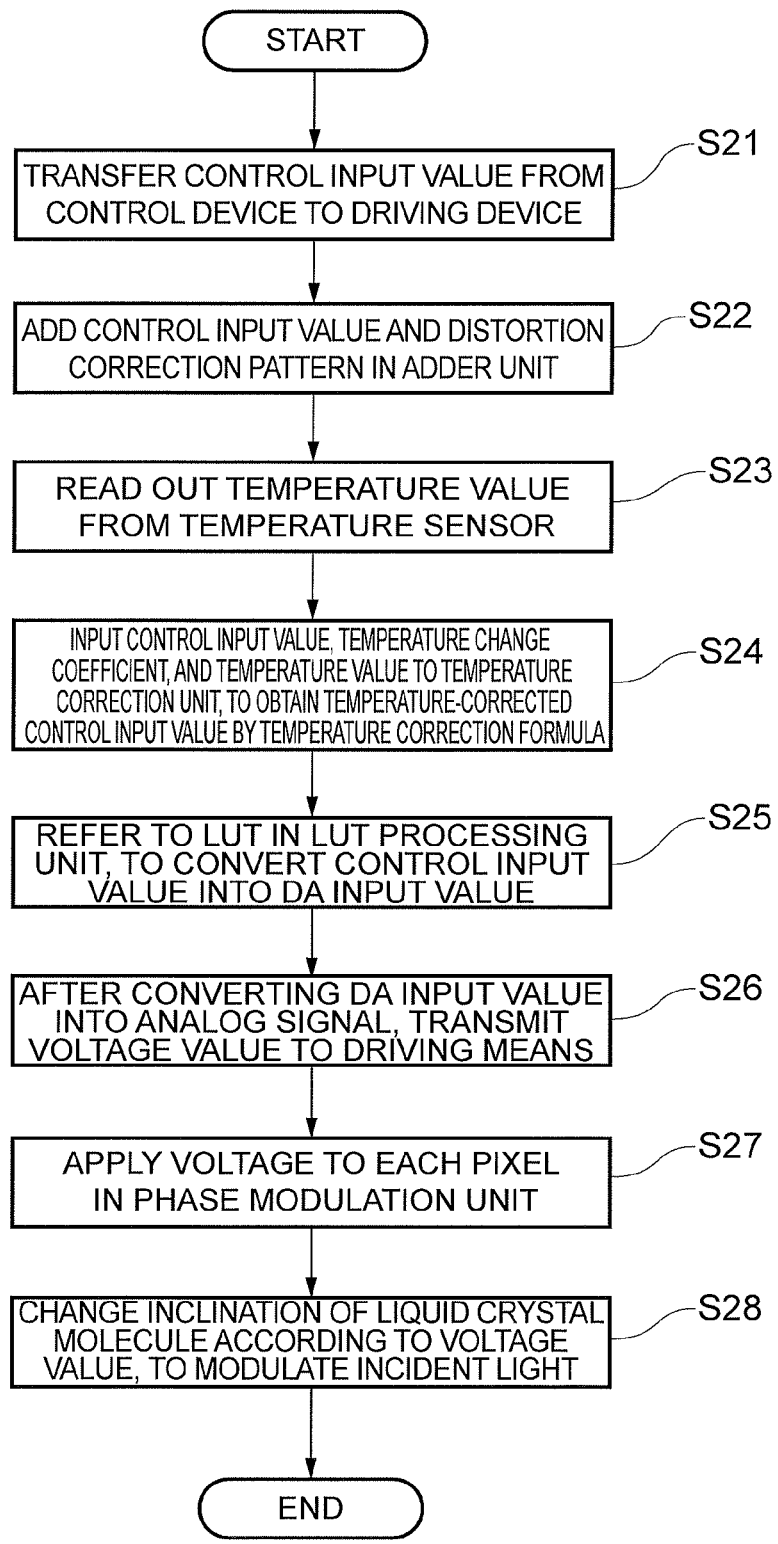
FIG. 10 is a flowchart showing a spatial light modulation method according to an embodiment.

Hereinafter, a spatial light modulation method of the present embodiment including a method of correcting phase modulation characteristics by use of the temperature change coefficient $\alpha$ will be described with reference to FIG. 10. FIG. 10 is a flowchart showing the spatial light modulation method of the present embodiment.

First, the phase pattern 33a stored in the hard disk 33 is converted into a control input value S1 in the control device 30A, and this control input value S1 is transferred from the control device 30A to the driving device 20A (Step S21). Next, this control input value S1 and the surface distortion correction pattern data 23a stored in the nonvolatile storage element 23 of the driving device 20A are added in the adder unit 24, to generate a control input value S2 (Step S22). Further, a current temperature of the phase modulation unit 10 detected by the temperature sensor 17 is read out by the temperature sensor processing unit 28 (Step S23, a temperature acquisition step). In addition, this Step S23 may be carried out in parallel with the above-described steps S21 and S22.

Next, the temperature change coefficient data 23b stored in the nonvolatile storage element 23, the current temperature value read out by the temperature sensor processing unit 28, and the control input value S2 are provided for the temperature correction unit 25. In the temperature correction unit 25, a calculation of a control input value S3 in which the effect by a temperature change in the liquid crystal layer 12 is corrected is carried out by use of the following temperature correction formula (4) (Step S24, a correction calculation step). In addition, in the formula (4), T is a current temperature of the phase modulation unit 10, T0 is a reference temperature (a temperature during inspection in one example) of the phase modulation unit 10, and S0 is a control input value for obtaining a desired phase modulation amount $\phi$ at the reference temperature T0.

[Formula 8]

$$S3 = \frac{S0}{100 - (T - T0) \times \alpha} \times 100 \quad (4)$$

Next, based on the LUT 23c, a predetermined calculation is carried out on the control input value S3, to generate a control input value S4 which is preferably input to the digital-analog converter unit 27 (Step S25). Then, an analog voltage for each pixel which is applied to the respective pixels of the phase modulation unit 10 is generated based on the control input value S4 in the digital-analog converter unit 27 (Step S26). These analog voltages are transmitted to the driving means 27a. Then, these analog voltages are output from the driving means 27a to the phase modulation unit 10, to be applied to the respective pixel electrodes 13a (Step S27, a voltage application step). In the phase modulation unit 10, the inclination of the liquid crystal molecules 12a changes according to a level of the applied voltage, to cause a change in refractive index. As a result, the phase distribution corresponding to the desired phase pattern 33a is spatially expressed, thereby modulating the phase of the incident light (Step S28).

The effects obtained by the spatial light modulation device 1A and the spatial light modulation method of the present embodiment which have been described above will be described. In the spatial light modulation device 1A and the spatial light modulation method, the nonvolatile storage element 23 of the driving device 20A stores one coefficient $\alpha$ included in a function expressing the correlation between a temperature change amount in the liquid crystal layer 12 and a variation in phase modulation amount in the liquid crystal layer 12. The inventors have found that a function expressing the relationship between a temperature change amount in the liquid crystal layer 12 and a variation in phase modulation amount is determined in advance (refer to the above-described formula (3)), and the coefficient $\alpha$ thereof is stored, thereby it is possible to preferably correct the variation in phase modulation amount by the temperature change without using a large number of LUTs. That is, in the spatial light modulation device 1A and the spatial light modulation method, the driving device 20A carries out a calculation for correcting a level of the applied voltage V by use of a temperature indicated by a temperature signal Stemp provided from the temperature sensor 17 and the above-described one coefficient $\alpha$. Thereby, it is possible to provide a spatial light modulation device and a spatial light modulation method in which it is possible to decrease a necessary storage capacity, which makes its production easy. Moreover, different from the case where an LUT which is a discrete data aggregate is used, it is possible to continuously obtain an applied voltage value corresponding to a desired phase modulation amount, so as to correspond to a temperature change in the liquid crystal layer 12. Accordingly, it is possible to correct the phase modulation characteristics at small temperature intervals of, for example, 1° C. or 0.1° C., and it is possible to improve the accuracy of an applied voltage value with respect to a desired phase modulation amount.

Further, in the spatial light modulation device 1A and the spatial light modulation method of the present embodiment, the temperature correction unit 25 corrects a control input value S3 by use of a temperature change coefficient α which is a proportionality coefficient between a temperature change amount δ of the liquid crystal layer 12 and a variation γ in phase modulation amount. The inventors have found, as shown in FIG. 9, that a temperature change amount δ and a variation γ in phase modulation amount have a pronounced proportional relationship (form a linear function) in a given applied voltage range A. By use of the slope (temperature change coefficient) α, it is possible to very easily correct a control input value S3 without storing large volumes of data. That is, in accordance with this spatial light modulation device 1A and the spatial light modulation method, it is possible to easily correct a variation in phase modulation amount by a temperature change in the liquid crystal layer 12.

In the present embodiment, the surface distortion correction pattern data 23a is stored in the nonvolatile storage element 23 of the driving device 20A. However, the surface distortion correction pattern data may be stored on the hard disk 33 of the control device 30A. In that case, it is preferable that the function of the adder unit 24 be realized by the central processing unit 31 and the memory 32 of the control device 30B.

Further, in the present embodiment, the desired phase pattern 33a is stored on the hard disk 33 of the control device 30A. However, the desired phase pattern may be stored in the nonvolatile storage element 23 of the driving device 20A. Even in that case, the control device 30A has a function of providing the trigger signal used for generating a vertical synchronizing signal and a horizontal synchronizing signal required for driving the phase modulation unit 10 to the driving device 20A.

Further, in the present embodiment, the phase modulation unit 10, the driving device 20A, and the control device 30A respectively have a housing independent of each other. However, the phase modulation unit 10 and the driving device 20A may be housed in a common housing. Or, the phase modulation unit 10, the driving device 20A, and the control device 30A may be all housed in a common housing.

Further, in the present embodiment, the phase modulation unit 10 may further have means (for example, a fan, a Peltier element, or the like) for making a temperature of the liquid crystal layer 12 controllable. With this, it is possible to decrease a range of temperature changes in the liquid crystal layer 12, and therefore, for example, it suffices to correct a variation of several degrees C. with respect to the reference temperature T0 by the temperature correction unit 25, which makes it possible to correct a variation in phase modulation amount by a temperature change in the liquid crystal layer 12 with higher accuracy.

Further, in the present embodiment, the temperature correction unit 25 corrects a control input value based on the formula (4). However, depending on a width of a range of voltages applied to the pixel electrodes 13a, the relationship between a temperature change amount δ and a variation γ in phase modulation amount may be nonlinear in some cases. In that case, it is preferable to determine coefficients $\beta_1$ to $\beta_n$ of the following approximate formula (5) in this nonlinear relationship in place of the coefficient α of the formula (3) in Step S13 described above.

[Formula 9]

$$\gamma = \beta_n \delta^n + \ldots + \beta_1 \delta + c \quad (5)$$

Then, it is preferable that these coefficients $\beta_1$ to $\beta_n$ be set as temperature change coefficients of the temperature change coefficient data 23b. Further, it is preferable that the temperature correction unit 25 perform a calculation of a control input value S3 in which the effect by a temperature change in the liquid crystal layer 12 is corrected by use of the following temperature correction formula (6) in place of the above-described temperature correction formula (4). In addition, in the formula (6), T is a current temperature of the phase modulation unit 10, T0 is a reference temperature (a temperature during inspection in one example) of the phase modulation unit 10, and S0 is a control input value for obtaining a desired phase modulation amount ϕ at the reference temperature T0.

[Formula 10]

$$S3 = \frac{S0}{100 - (T - T0) \times \beta_1 - \ldots - (T - T0)^n \times \beta_n} \times 100 \quad (6)$$

By performing temperature correction by use of such nonlinear coefficients, it is possible to perform phase modulation with higher accuracy (for example, in units of 1° of phase, in units of 0.1°, or in units of 0.01°) regardless of the temperature change in the liquid crystal layer 12.

(First Modification)

Figure 11:
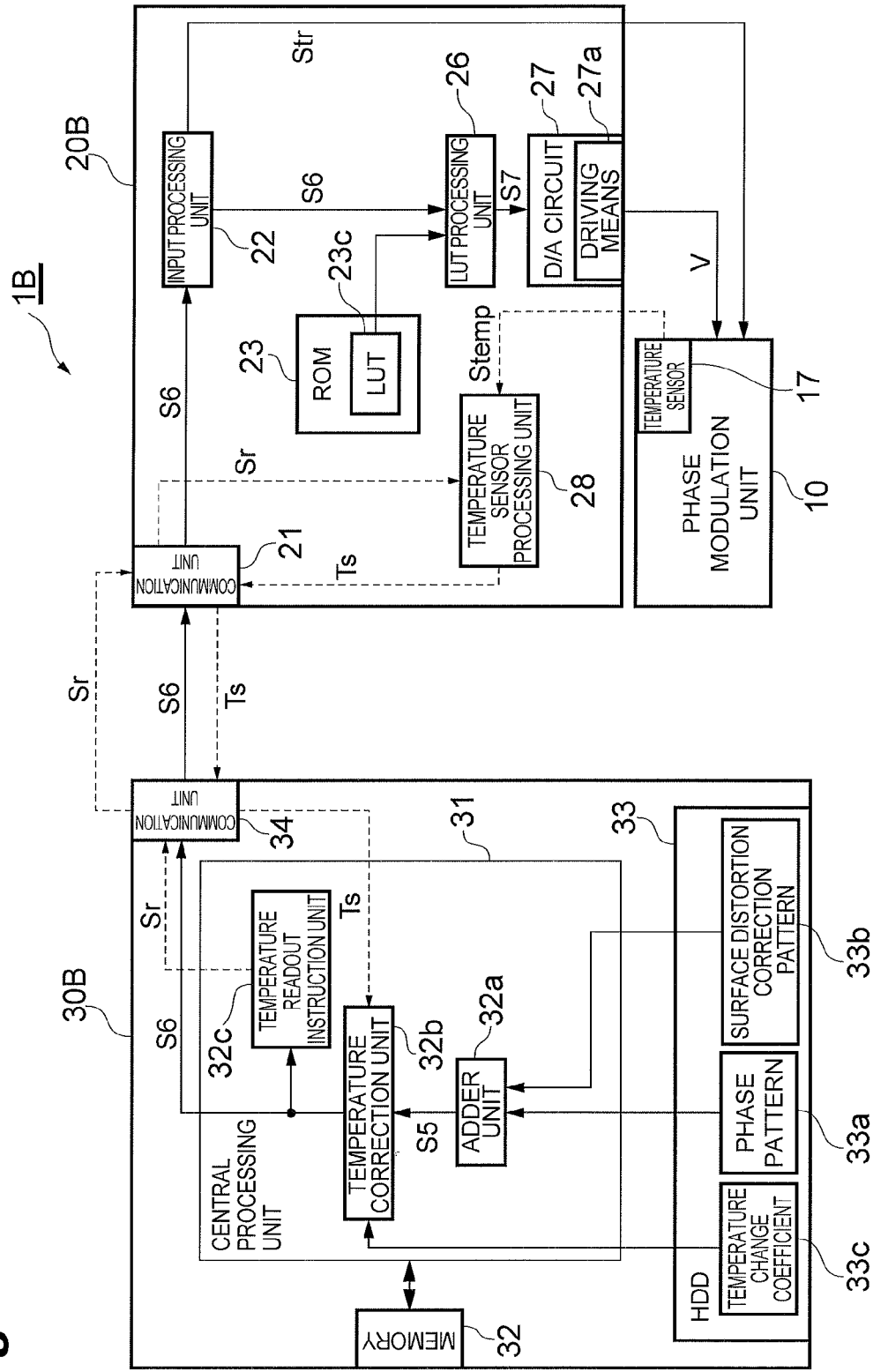
FIG. 11 is a block diagram showing a configuration of a spatial light modulation device that is a first modification.

FIG. 11 is a block diagram showing a configuration of a spatial light modulation device 1B that is a first modification of the above-described embodiment. As shown in FIG. 11, the spatial light modulation device 1B according to the present modification includes, in addition to the phase modulation unit 10, a driving device 20B and a control device 30B serving as a voltage generation unit. In addition, because the configuration of the phase modulation unit 10 is the same as the configuration of the phase modulation unit 10 of the above-described embodiment, the detailed descriptions thereof will be omitted.

The control device 30B is preferably realized by, for example, an electronic computer or the like having the central processing unit 31, the memory 32, and the hard disk 33 in the same way as the control device 30A of the above-described embodiment. However, in this modification, the hard disk 33 stores not only the desired phase pattern 33a, but also surface distortion correction pattern data 33b, and temperature change coefficient data 33c. The surface distortion correction pattern data 33b is data corresponding to the surface distortion correction pattern data 23a of the above-described embodiment, and data for correcting surface distortion generated on the surface of the first electrode 13 at the time of making up circuit elements around the pixel electrodes 13a on the silicon substrate 11 by a phase difference provided by the liquid crystal layer 12. Further, the temperature change coefficient data 33c is data corresponding to the temperature change coefficient data 23b of the above-described embodiment, and data on coefficients for correcting a variation in the relationship between an applied voltage to the pixel electrodes 13a and a phase modulation amount by a temperature change in the liquid crystal layer 12.

As shown in FIG. 11, the central processing unit 31 realizes an adder unit 32a, a temperature correction unit 32b, and a temperature readout instruction unit 32c by reading a predetermined program stored in the memory 32. The adder unit 32a reads out the phase pattern 33a and the surface distortion correction pattern data 33b from the hard disk 33, and adds these one to another to generate a control input value S5. The temperature readout instruction unit 32c generates a signal Sr for requesting data on a temperature of the liquid crystal layer 12 to the driving device 20B. This signal Sr is transmitted to the temperature sensor processing unit 28 of the driving device 20B via the communication unit 34. The temperature correction unit 32b reads out the temperature change coefficient data 33c from the hard disk 33 and receives data on the current temperature of the phase modulation unit 10 from the driving device 20B, and performs predetermined arithmetic processing on the control input value S5 based on these data. In addition, this calculation is the same as the calculation carried out by the temperature correction unit 25 in the above-described embodiment. The temperature correction unit 32b provides a control input value S6 after calculation to the driving device 20B via the communication unit 34.

The driving device 20B has the communication unit 21, the input processing unit 22, the nonvolatile storage element 23, the LUT processing unit 26, the digital-analog converter unit 27, and the temperature sensor processing unit 28. The configurations and operations thereof are the same as those in the above-described embodiment. In addition, the driving device 20B of the present modification does not have the adder unit 24 and the temperature correction unit 25 in the above-described embodiment, and the nonvolatile storage element 23 does not store the surface distortion correction pattern data 23a and the temperature change coefficient data 23b. These components are included in the control device 30B which has been already described.

Figure 12:
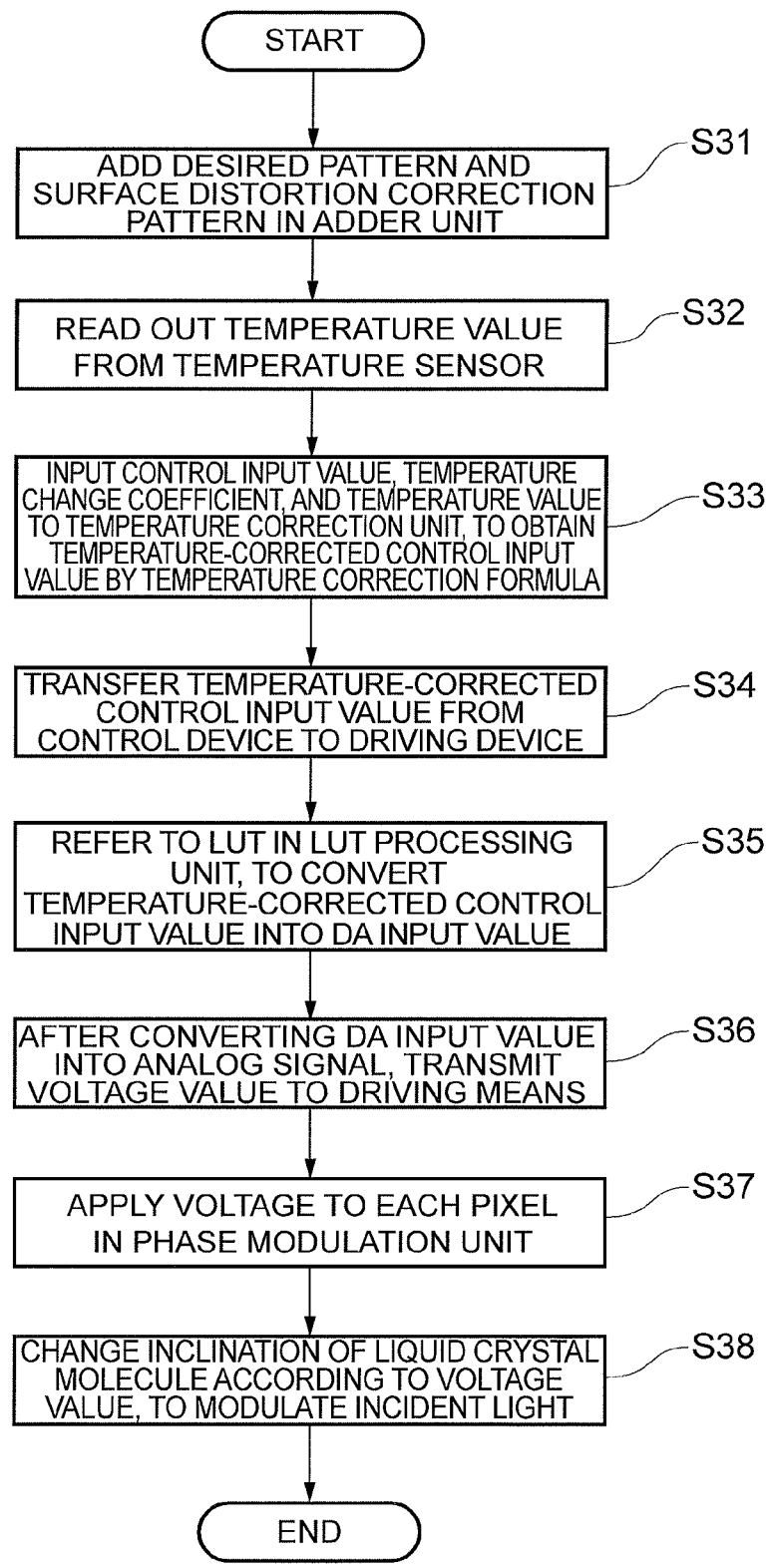
FIG. 12 is a flowchart showing a spatial light modulation method according to the first modification.

FIG. 12 is a flowchart showing a spatial light modulation method according to the present modification. Hereinafter, the operations of the spatial light modulation method and the spatial light modulation device 1B according to the present modification will be described with reference to FIG. 12.

First, the phase pattern 33a and the surface distortion correction pattern data 33b stored in the hard disk 33 are read out by the central processing unit 31, and these are added one to another, to generate a control input value S5 (Step S31). Further, a temperature signal Stemp of a current temperature of the liquid crystal layer 12 detected by the temperature sensor 17 is transmitted to the temperature sensor processing unit 28, and a temperature value Ts indicated by the temperature signal Stemp is transmitted to the central processing unit 31 via the communication unit 34 (Step S32, a temperature acquisition step). In addition, this Step S32 may be carried out in parallel with the above-described Step S31.

Next, the temperature change coefficient data 33c stored in the hard disk 33 and the current temperature value Ts are read out by the central processing unit 31, and the calculation shown in the above-described formula (4) is carried out on the control input value S5, thereby calculating a control input value S6 in which the effect by a temperature change in the liquid crystal layer 12 is corrected (Step S33, a correction calculation step). This control input value S6 is transmitted from the control device 30B to the driving device 20B (Step S34).

Next, based on the LUT 23c, a predetermined calculation is carried out on the control input value S6, to generate a control input value S7 which is preferably input to the digital-analog converter unit 27 (Step S35). Then, an analog voltage V for each pixel which is applied to the respective pixels of the phase modulation unit 10 is generated based on the control input value S7 in the digital-analog converter unit 27 (Step S36). These analog voltages V are transmitted to the driving means 27a. Then, these analog voltages V are output from the driving means 27a to the phase modulation unit 10, to be applied to the respective pixel electrodes 13a (Step S37, a voltage application step). In the phase modulation unit 10, the inclination of the liquid crystal molecules 12a changes according to a level of the applied voltage V, to cause a change in refractive index. As a result, the phase distribution corresponding to the desired phase pattern 33a is spatially expressed, thereby modulating the phase of the incident light (Step S38).

In accordance with the spatial light modulation device 1B and the spatial light modulation method according to the present modification described above, in the same way as the above-described embodiment, because the temperature correction unit 32b corrects the control input value S5 by use of the temperature change coefficient, it is possible to easily correct a variation in phase modulation amount by a temperature change in the liquid crystal layer 12. Moreover, it is possible to decrease a necessary storage capacity, which makes its production easy, and it is possible to improve the accuracy of an applied voltage value with respect to a desired phase modulation amount.

In addition, in the present modification, the LUT 23c is stored in the nonvolatile storage element 23 of the driving device 20B. However, the LUT may be stored on the hard disk 33 of the control device 30B. In that case, it is preferable that the LUT processing unit may be realized by the central processing unit 31 and the memory 32 of the control device 30B.

(Second Modification)

Figure 13:
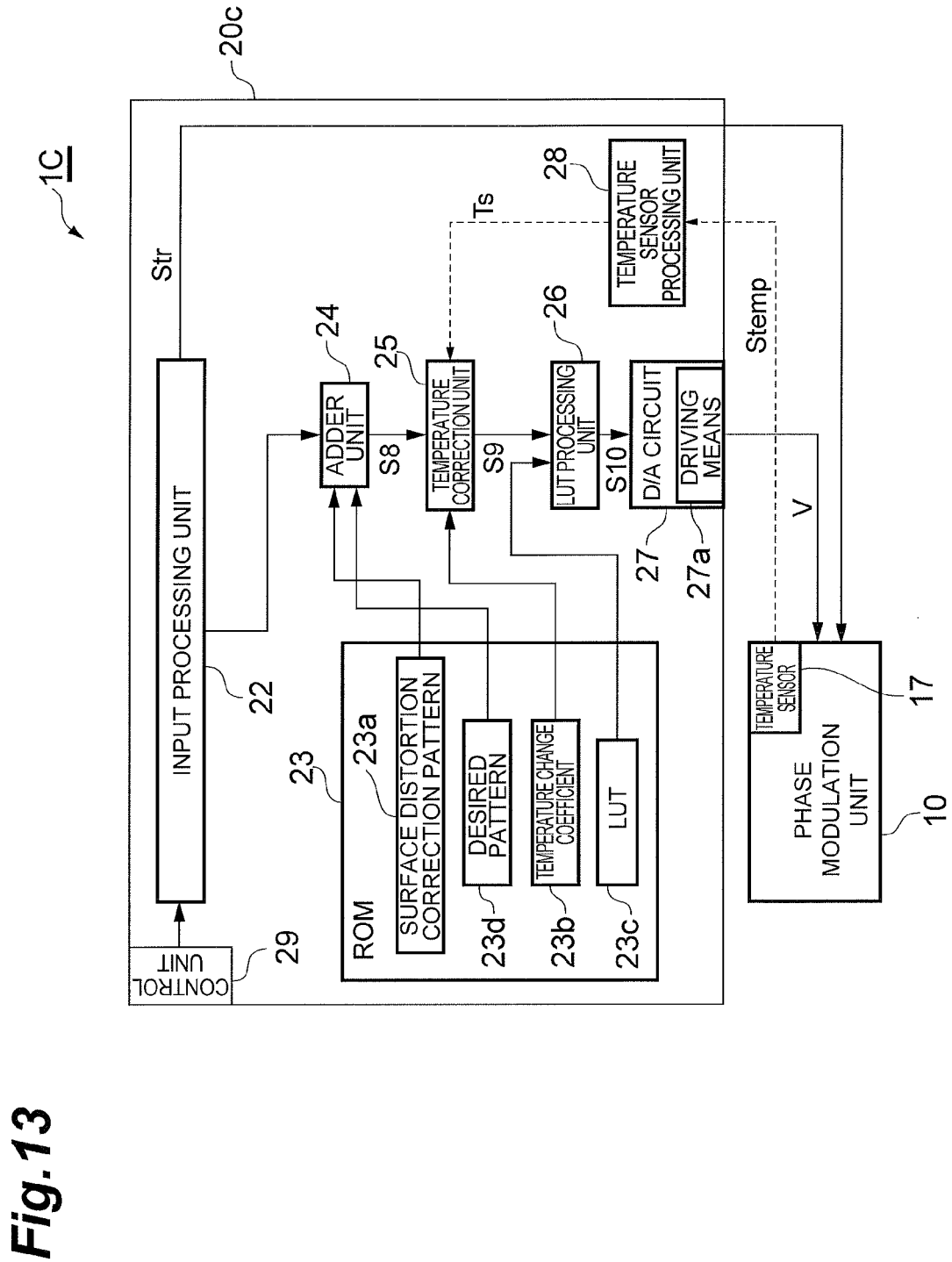
FIG. 13 is a block diagram showing a configuration of a spatial light modulation device that is a second modification.
Figure 14:
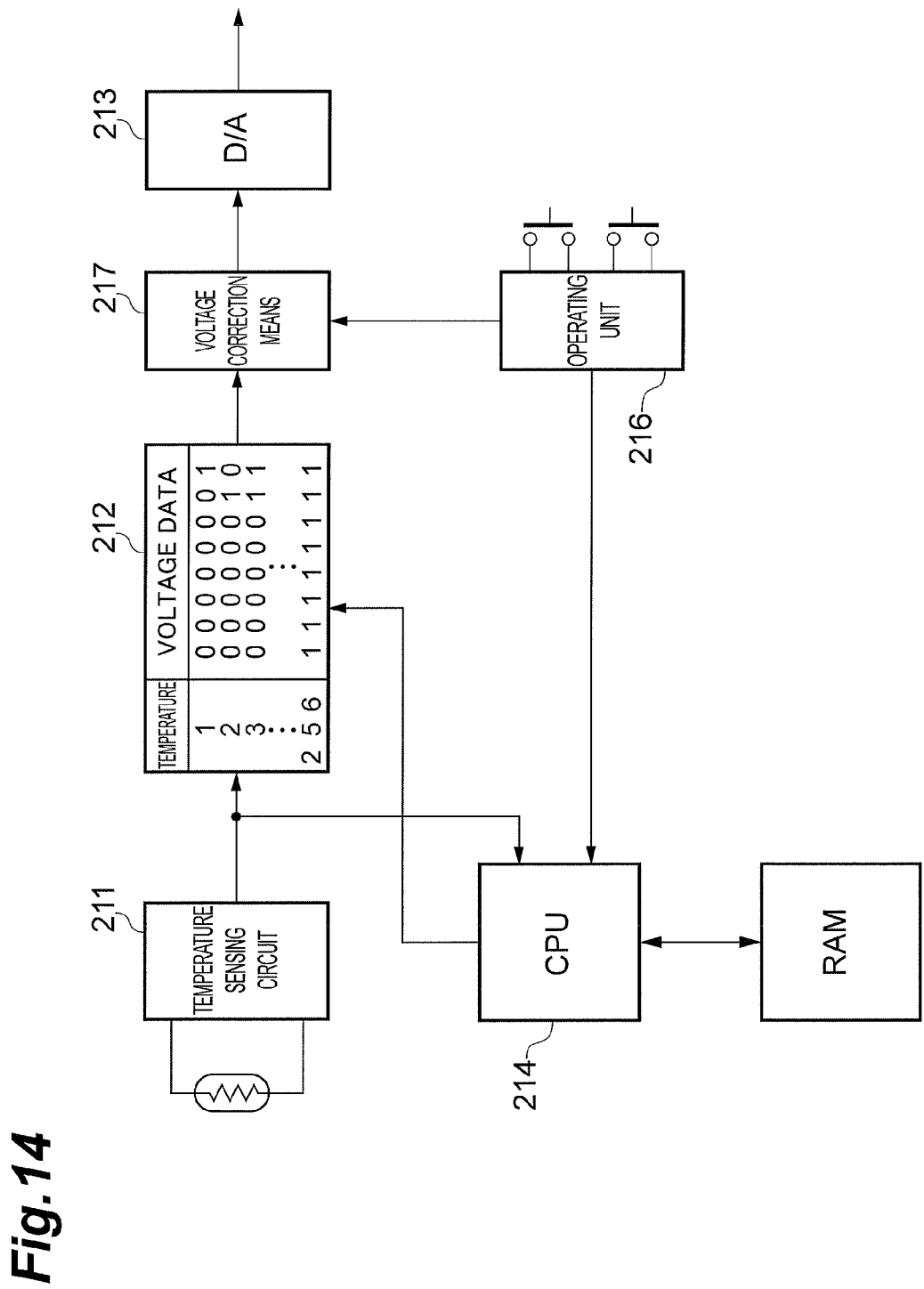
FIG. 14 is a block diagram showing a configuration of a device described in Patent Document 1.
Figure 15:
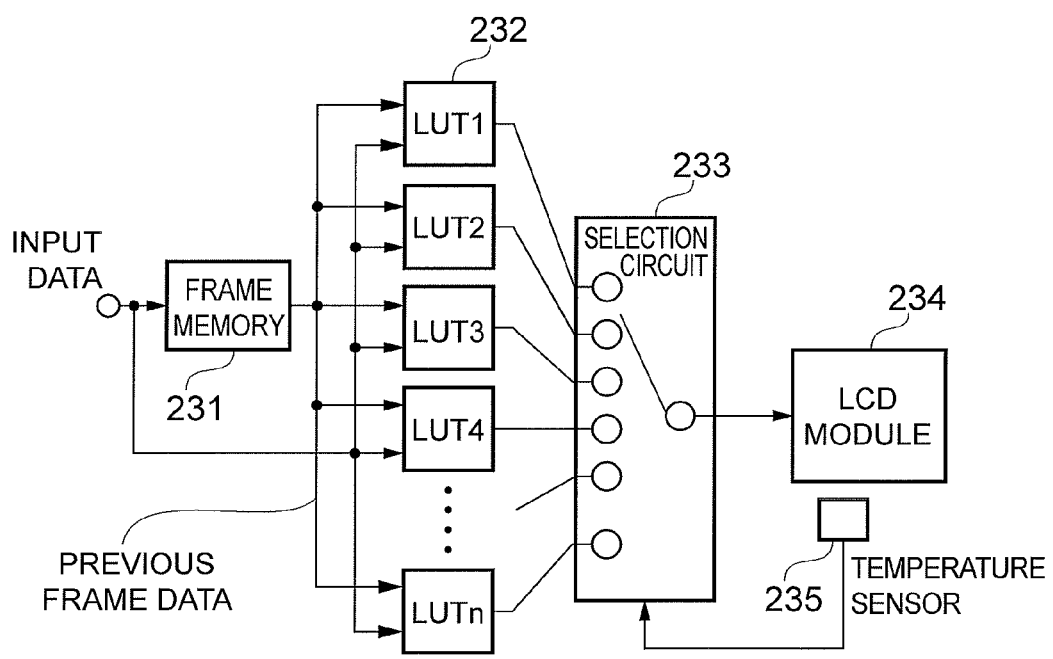
FIG. 15 is a block diagram showing a configuration of a liquid crystal panel driving device described in Patent Document 2.
Figure 16:
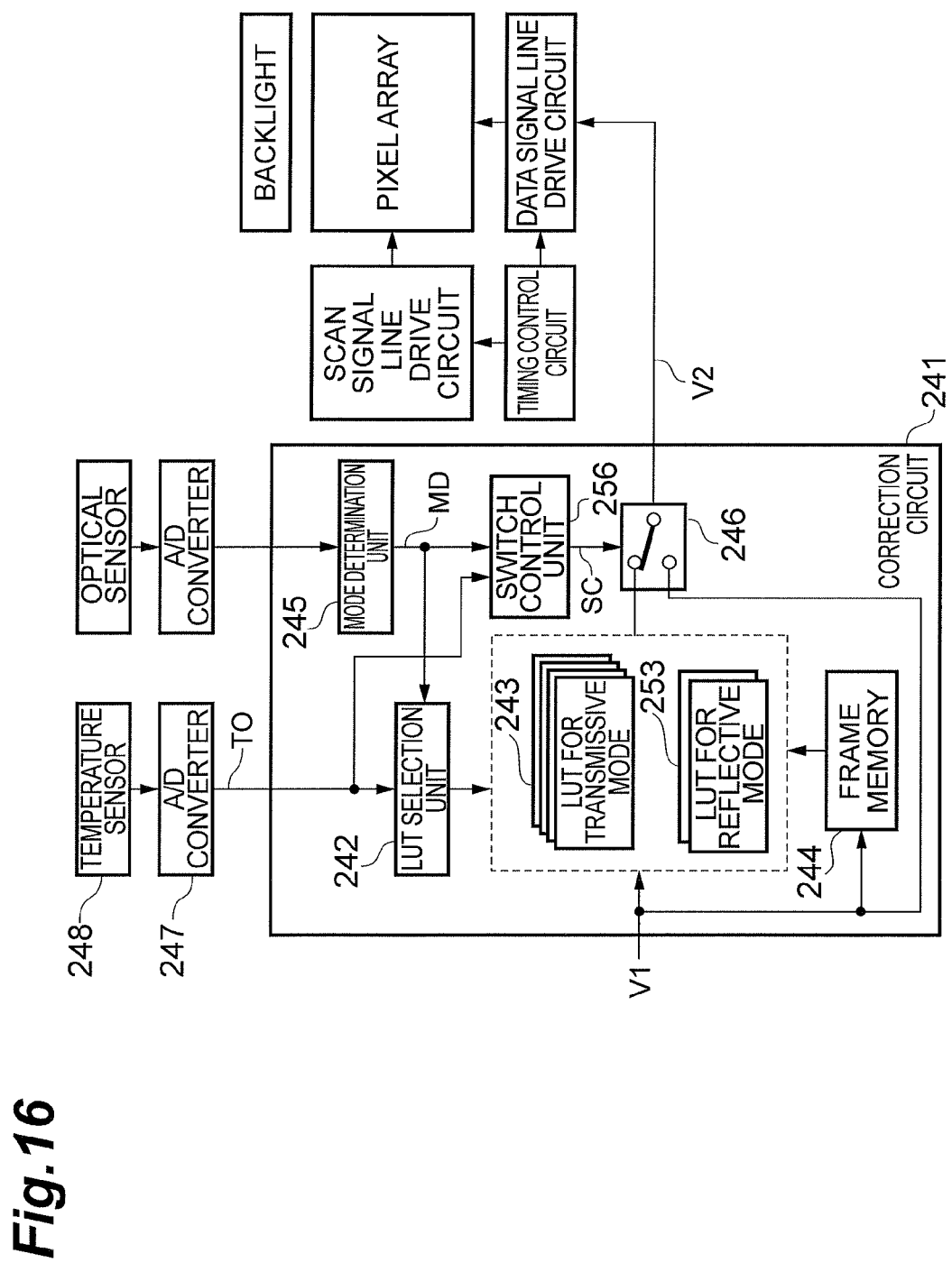
FIG. 16 is a block diagram showing a configuration of a liquid crystal display device described in Patent Document 3.

FIG. 13 is a block diagram showing a configuration of a spatial light modulation device 1C that is a second modification of the above-described embodiment. As shown in FIG. 13, the spatial light modulation device 1C according to the present modification includes the phase modulation unit 10, and a driving device 20C serving as a voltage generation unit. Between these, the configuration of the phase modulation unit 10 is the same as the configuration of the phase modulation unit 10 of the above-described embodiment.

The driving device 20C has a control unit 29. The control unit 29 is preferably realized by, for example, an electronic computer or the like having a central processing unit (CPU), a memory, and a hard disk. Further, the driving device 20C has the input processing unit 22, the nonvolatile storage element 23, the adder unit 24, the temperature correction unit 25, the LUT processing unit 26, the digital-analog converter unit 27, and the temperature sensor processing unit 28.

The input processing unit 22 generates a trigger signal Str for generating a vertical synchronizing signal and a horizontal synchronizing signal based on the signal received from the control unit 29. The nonvolatile storage element 23 stores a desired phase pattern 23d, in addition to the surface distortion correction pattern data 23a, the temperature change coefficient data 23b, and the LUT 23c. The phase pattern 23d corresponds to the phase pattern 33a in the above-described embodiment.

The adder unit 24 reads out the surface distortion correction pattern data 23a and the phase pattern 23d from the nonvolatile storage element 23, and adds these one to another to generate a surface-distortion-corrected control input value S8. The adder unit 24 outputs the generated control input value S8 to the temperature correction unit 25. The temperature correction unit 25 performs predetermined arithmetic processing on the control input value S8 based on the temperature change coefficient data 23b and the temperature value Ts obtained from the temperature sensor processing unit 28, thereby generating a control input value S9. The LUT processing unit 26 performs predetermined arithmetic processing on the control input value S9 by use of the LUT 23c, thereby generating a control input value S10 which is preferably input to the digital-analog converter unit 27. The digital-analog converter unit 27 generates an analog voltage V for each pixel which is applied to the respective pixels of the phase modulation unit 10 based on the control input value S10. These analog voltages V are output to the phase modulation unit 10 through the driving means 27a, to be applied to the respective pixel electrodes 13a (refer to FIG. 2).

In accordance with the spatial light modulation device 1C according to the present modification described above, in the same way as the above-described embodiment, because the temperature correction unit 25 corrects the control input value S8 by use of a temperature change coefficient, it is possible to easily correct a variation in phase modulation amount by a temperature change in the liquid crystal layer 12. Moreover, it is possible to decrease a necessary storage capacity, which makes its production easy, and it is possible to improve the accuracy of an applied voltage value with respect to a desired phase modulation amount.

The spatial light modulation device and the spatial light modulation method according to the present invention are not limited to the embodiment described above, and other various modifications are possible. For example, in the above-described embodiment, the case where the pixel electrodes of the phase modulation unit are two-dimensionally arrayed in a plurality of rows and a plurality of columns has been exemplified, however, the spatial light modulation device in the present invention is not limited to this case, and may have a configuration in which, for example, a plurality of pixel electrodes are one-dimensionally arrayed.

A spatial light modulation device according to the above-described embodiment is a spatial light modulation device which modulates a phase of incident light for each of a plurality of pixels one-dimensionally or two-dimensionally arrayed, and the device includes (1) a liquid crystal layer that modulates a phase of the incident light according to a level of an applied electric field, (2) a temperature sensor that generates a temperature signal which is a signal corresponding to a temperature of the liquid crystal layer, (3) a plurality of pixel electrodes which are provided for each of the plurality of pixels and apply a voltage for generating the applied electric field to the liquid crystal layer, and (4) a voltage generation unit that provides the voltage to the plurality of pixel electrodes. The voltage generation unit has storage means which stores in advance one or a plurality of coefficients included in a function expressing a correlation between a temperature change amount with respect to a reference temperature of the liquid crystal layer and a variation in phase modulation amount in the liquid crystal layer, and carries out a calculation for correcting a level of the voltage by use of a temperature indicated by the temperature signal provided from the temperature sensor and the one or plurality of coefficients.

Further, the spatial light modulation device may have a configuration in which the function is a linear function, and the number of the coefficients is one. In this case, it is preferable for the spatial light modulation device that the range of the voltage is limited to a predetermined range in which it is possible to approximate the function as a linear function. Further, the spatial light modulation device may have a configuration in which the function is an n-th order function (n is an integer not less than 2), and the number of the coefficients is n.

Further, a spatial light modulation method according to the above-described embodiment is a spatial light modulation method which uses a liquid crystal layer that modulates a phase of incident light according to a level of an applied electric field, and a plurality of pixel electrodes which are provided for each of a plurality of pixels one-dimensionally or two-dimensionally arrayed, and apply a voltage for generating the applied electric field to the liquid crystal layer, and the method includes (1) a temperature acquisition step of acquiring a temperature signal which is a signal corresponding to a temperature of the liquid crystal layer from a temperature sensor, (2) a correction calculation step of reading out one or a plurality of coefficients from storage means which stores in advance the one or plurality of coefficients included in a function expressing a correlation between a temperature change amount with respect to a reference temperature of the liquid crystal layer and a variation in phase modulation amount in the liquid crystal layer, and carrying out a calculation for correcting a level of the voltage by use of a temperature indicated by the temperature signal, and the one or plurality of coefficients, and (3) a voltage application step of providing the corrected voltage to the plurality of pixel electrodes.

Further, the spatial light modulation method may have a configuration in which the function is a linear function, and the number of the coefficients is one. In this case, it is preferable for the spatial light modulation method that the range of the voltage is limited to a predetermined range in which it is possible to approximate the function as a linear function. Further, the spatial light modulation method may have a configuration in which the function is an n-th order function (n is an integer not less than 2), and the number of the coefficients is n.

Industrial Applicability

The present invention is applicable as a spatial light modulation device and a spatial light modulation method in which it is possible to decrease a necessary storage capacity, which makes its production easy, and it is possible to improve the accuracy of an applied voltage value with respect to a desired phase modulation amount.

Reference Signs List 1A to 1C-spatial light modulation device, 10-phase modulation unit, 11-silicon substrate, 12-liquid crystal layer, 12a-liquid crystal molecule, 13, 14-electrode, 13a-pixel electrode, 15-glass substrate, 16-spacer, 17-temperature sensor, 20A to 20C-driving device, 21-communication unit, 22-input processing unit, 23-nonvolatile storage element, 23a, 33b-surface distortion correction pattern data, 23b, 33c-temperature change coefficient data, 23c-LUT, 23d, 33a-phase pattern, 24-adder unit, 25-temperature correction unit, 26-LUT processing unit, 27-digital-analog converter unit, 27a-driving means, 28-temperature sensor processing unit, 30A, 30B-control device, 31-central processing unit, 32-memory, 32a-adder unit, 32b-temperature correction unit, 32c-temperature readout instruction unit, 33-hard disk, 34-communication unit, 41-basic database, 50A-voltage generation unit, 100-polarization interferometer, 101-temperature control device, 102-half mirror, 103-lens, 104-analyzer, 105-polarizer, 106-light source, 107-light receiving element, A-applied voltage range, S1 to S10-control input value, Stemp-temperature signal.

The invention claimed is:

1. A spatial light modulation device which modulates a phase of incident light for each of a plurality of pixels one-dimensionally or two-dimensionally arrayed, the device comprising:

a liquid crystal layer modulating a phase of the incident light according to a level of an applied electric field;

a temperature sensor generating a temperature signal which is a signal corresponding to a temperature of the liquid crystal layer;

a plurality of pixel electrodes which are provided for each of the plurality of pixels and apply a voltage for generating the applied electric field to the liquid crystal layer; and a voltage generation unit providing the voltage to the plurality of pixel electrodes, wherein the voltage generation unit has storage means storing in advance one or a plurality of coefficients included in a function expressing a correlation between a temperature change amount with respect to a reference temperature of the liquid crystal layer and a variation in phase modulation amount in the liquid crystal layer, and a look up table for correcting nonlinearity between a level of the voltage and the phase modulation amount at the reference temperature, and carries out a calculation for correcting the level of the voltage to be applied to each pixel electrode by correcting a control input value S for controlling the level of the voltage by use of a temperature indicated by the temperature signal provided from the temperature sensor and the one or plurality of coefficients, and determining the level of the voltage based on the corrected control input value S by use of the look up table.

2. A spatial light modulation method which uses a liquid crystal layer modulating a phase of incident light according to a level of an applied electric field, and a plurality of pixel electrodes which are provided for each of a plurality of pixels one-dimensionally or two-dimensionally arrayed, and apply a voltage for generating the applied electric field to the liquid crystal layer, the method comprising:

a temperature acquisition step of acquiring a temperature signal which is a signal corresponding to a temperature of the liquid crystal layer from a temperature sensor;

a correction calculation step of reading out one or a plurality of coefficients and a look up table from storage means storing in advance the one or plurality of coefficients included in a function expressing a correlation between a temperature change amount with respect to a reference temperature of the liquid crystal layer and a variation in phase modulation amount in the liquid crystal layer, and the look up table for correcting nonlinearity between a level of the voltage and the phase modulation amount at the reference temperature, and carrying out a calculation for correcting the level of the voltage to be applied to each pixel electrode by correcting a control input value S for controlling the level of the voltage by use of a temperature indicated by the temperature signal and the one or plurality of coefficients, and determining the level of the voltage based on the corrected control input value S by use of the look up table; and a voltage application step of providing the corrected voltage to the plurality of pixel electrodes.

3. A spatial light modulation device which modulates a phase of incident light for each of a plurality of pixels one-dimensionally or two-dimensionally arrayed, the device comprising:

a liquid crystal layer modulating a phase of the incident light according to a level of an applied electric field;

a temperature sensor generating a temperature signal which is a signal corresponding to a temperature of the liquid crystal layer;

a plurality of pixel electrodes which are provided for each of the plurality of pixels and apply a voltage for generating the applied electric field to the liquid crystal layer; and a voltage generation unit providing the voltage to the plurality of pixel electrodes, wherein the voltage generation unit has storage means storing in advance one or a plurality of coefficients included in a function expressing a correlation between a temperature change amount with respect to a reference temperature of the liquid crystal layer and a variation in phase modulation amount in the liquid crystal layer, and carries out a calculation for correcting a level of the voltage by use of a temperature indicated by the temperature signal provided from the temperature sensor, and the one or plurality of coefficients, the function is a linear function, and the number of the coefficients is one, and the voltage generation unit corrects a control input value S for controlling a level of the voltage based on the following formula:

$$S = \frac{S0}{100 - (T - T0) \times \alpha} \times 100$$

(where, T is a temperature indicated by the temperature signal provided from the temperature sensor, T0 is a reference temperature, S0 is a control input value for obtaining a desired phase modulation amount at the reference temperature T0, and $\alpha$ is the coefficient).

4. A spatial light modulation device which modulates a phase of incident light for each of a plurality of pixels one-dimensionally or two-dimensionally arrayed, the device comprising:

a liquid crystal layer modulating a phase of the incident light according to a level of an applied electric field;

a temperature sensor generating a temperature signal which is a signal corresponding to a temperature of the liquid crystal layer;

a plurality of pixel electrodes which are provided for each of the plurality of pixels and apply a voltage for generating the applied electric field to the liquid crystal layer; and a voltage generation unit providing the voltage to the plurality of pixel electrodes, wherein the voltage generation unit has storage means storing in advance one or a plurality of coefficients included in a function expressing a correlation between a temperature change amount with respect to a reference temperature of the liquid crystal layer and a variation in phase modulation amount in the liquid crystal layer, and carries out a calculation for correcting a level of the voltage by use of a temperature indicated by the temperature signal provided from the temperature sensor, and the one or plurality of coefficients, the function is an n-th order function (n is an integer not less than 2), and the number of the coefficients is n, and the voltage generation unit corrects a control input value S for controlling a level of the voltage based on the following formula:

$$S = \frac{S0}{100 - (T - T0) \times \beta_1 - \ldots - (T - T0)^n \times \beta_n} \times 100$$

(where, T is a temperature indicated by the temperature signal provided from the temperature sensor, T0 is a reference temperature, S0 is a control input value for obtaining a desired phase modulation amount at the reference temperature T0, and $\beta_1 \ldots \beta_n$ are the n coefficients).

5. A spatial light modulation method which uses a liquid crystal layer modulating a phase of incident light according to a level of an applied electric field, and a plurality of pixel electrodes which are provided for each of a plurality of pixels one-dimensionally or two-dimensionally arrayed, and apply a voltage for generating the applied electric field to the liquid crystal layer, the method comprising:

a temperature acquisition step of acquiring a temperature signal which is a signal corresponding to a temperature of the liquid crystal layer from a temperature sensor;

a correction calculation step of reading out one or a plurality of coefficients from storage means storing in advance the one or plurality of coefficients included in a function expressing a correlation between a temperature change amount with respect to a reference temperature of the liquid crystal layer and a variation in phase modulation amount in the liquid crystal layer, and carrying out a calculation for correcting a level of the voltage by use of a temperature indicated by the temperature signal, and the one or plurality of coefficients; and a voltage application step of providing the corrected voltage to the plurality of pixel electrodes, wherein the function is a linear function, and the number of the coefficients is one, and in the correction calculation step, a control input value S for controlling a level of the voltage is corrected based on the following formula:

$$S = \frac{S0}{100 - (T - T0) \times \alpha} \times 100$$

(where, T is a temperature indicated by the temperature signal provided from the temperature sensor, T0 is a reference temperature, S0 is a control input value for obtaining a desired phase modulation amount at the reference temperature T0, and $\alpha$ is the coefficient).

6. A spatial light modulation method which uses a liquid crystal layer modulating a phase of incident light according to a level of an applied electric field, and a plurality of pixel electrodes which are provided for each of a plurality of pixels one-dimensionally or two-dimensionally arrayed, and apply a voltage for generating the applied electric field to the liquid crystal layer, the method comprising:

a temperature acquisition step of acquiring a temperature signal which is a signal corresponding to a temperature of the liquid crystal layer from a temperature sensor;

a correction calculation step of reading out one or a plurality of coefficients from storage means storing in advance the one or plurality of coefficients included in a function expressing a correlation between a temperature change amount with respect to a reference temperature of the liquid crystal layer and a variation in phase modulation amount in the liquid crystal layer, and carrying out a calculation for correcting a level of the voltage by use of a temperature indicated by the temperature signal, and the one or plurality of coefficients; and a voltage application step of providing the corrected voltage to the plurality of pixel electrodes, wherein the function is an n-th order function (n is an integer not less than 2), and the number of the coefficients is n, and in the correction calculation step, a control input value S for controlling a level of the voltage is corrected based on the following formula:

$$S = \frac{S0}{100 - (T - T0) \times \beta_1 - \ldots - (T - T0)^n \times \beta_n} \times 100$$

(where, T is a temperature indicated by the temperature signal provided from the temperature sensor, T0 is a reference temperature, S0 is a control input value for obtaining a desired phase modulation amount at the reference temperature T0, and $\beta_1 \ldots \beta_n$ are the n coefficients).

* * * * *